US010678786B2

(12) United States Patent
Zeng et al.

(10) Patent No.: US 10,678,786 B2
(45) Date of Patent: Jun. 9, 2020

(54) TRANSLATING SEARCH QUERIES ON ONLINE SOCIAL NETWORKS

(71) Applicant: Facebook, Inc., Menlo Park, CA (US)

(72) Inventors: Bo Zeng, San Francisco, CA (US); Haixun Wang, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 214 days.

(21) Appl. No.: 15/728,189

(22) Filed: Oct. 9, 2017

(65) Prior Publication Data

US 2019/0108228 A1    Apr. 11, 2019

(51) Int. Cl.
| | |
|---|---|
| *G06F 16/2452* | (2019.01) |
| *G06N 3/04* | (2006.01) |
| *G06F 16/248* | (2019.01) |
| *G06F 16/9535* | (2019.01) |
| *G06Q 50/00* | (2012.01) |

(52) U.S. Cl.
CPC ...... *G06F 16/24522* (2019.01); *G06F 16/248* (2019.01); *G06F 16/9535* (2019.01); *G06N 3/0445* (2013.01); *G06N 3/0454* (2013.01); *G06Q 50/01* (2013.01)

(58) Field of Classification Search
CPC ................................................ G06F 16/24522
USPC ........................................................ 707/722
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |

(Continued)

OTHER PUBLICATIONS

Wang, "Building a semantic parser overnight,", 2015, Proc. 53rd Annual Meeting of the ACL and 7th Intl Joint Conf. on Natural Language Processing of the Asian Federation of Natural Language Processing, vol. 1: Long Papers, pp. 1332-1342 (Year: 2015).*

(Continued)

*Primary Examiner* — Pierre M Vital
*Assistant Examiner* — Andrew N Ho
(74) *Attorney, Agent, or Firm* — Jordan IP Law, LLC

(57) ABSTRACT

In one embodiment, a method includes receiving a search query comprising one or more n-grams from a client system associated with a user of an online social network, generating one or more term embeddings representing the one or more n-grams of the search query, respectively, encoding the one or more term embeddings to generate a query embedding representing the search query, decoding the query embedding to generate one or more output term embeddings representing one or more query tokens, constructing a query command from the one or more output term embeddings, executing the query command to retrieve one or more search results, and sending, to the client system in response to the search query, instructions for generating a search-results interface for presentation to the user, the search-results interface comprising one or more of the retrieved search results.

19 Claims, 14 Drawing Sheets

(56) References Cited

U.S. PATENT DOCUMENTS

| | | |
|---|---|---|
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,105,068 B2 | 8/2015 | Lee |
| 9,367,607 B2 | 6/2016 | Vee |
| 9,830,315 B1 * | 11/2017 | Xiao .................. G06F 17/2785 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |

(56) References Cited

U.S. PATENT DOCUMENTS

| | | |
|---|---|---|
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0356075 A1* | 12/2015 | Rao ................... G06N 3/0445 705/2 |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2017/0046390 A1 | 2/2017 | Jain |
| 2017/0083523 A1 | 3/2017 | Philip |
| 2017/0083628 A1 | 3/2017 | Frenkel |
| 2017/0169475 A1* | 6/2017 | Korpusik ........... G06Q 30/0269 |
| 2017/0323636 A1* | 11/2017 | Xiao ................... G06F 16/332 |
| 2018/0060727 A1* | 3/2018 | Rainwater ........... G06N 3/0445 |
| 2018/0150743 A1* | 5/2018 | Ma ........................ G06N 3/084 |
| 2018/0203852 A1* | 7/2018 | Goyal ................. G06F 17/2881 |
| 2018/0275967 A1* | 9/2018 | Mohamed ................ G06F 8/30 |

OTHER PUBLICATIONS

U.S. Appl. No. 15/355,500, filed Nov. 18, 2016, Stoyanov.
U.S. Appl. No. 15/365,789, filed Nov. 30, 2016, Wang.
U.S. Appl. No. 15/365,797, filed Nov. 30, 2016, Wang.
U.S. Appl. No. 15/728,253, filed Oct. 9, 2017, Zeng.

* cited by examiner

TRANSLATING SEARCH QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, when a social-networking system receives a search query from a client system associated with a user, the social-networking system may determine whether the search query is a grammar query or not. A grammar query is a type of complex search query that references particular unique entities within the online social network. The grammar query can be translated into a query command, where the query command comprises one or more query constraints. A non-grammar query is a search query that does not necessarily reference particular unique entities within the online social network, and may contain one or more keywords that are required to be in the search results returned when executing the query. When the social-networking system determines that the search query is a grammar query, the social-networking system may map the query directly to an executable query command using an embedding-based translation model without relying on templates or context-free grammar models. With the context-free grammar models, the social-networking system may have constructed a query command by parsing the search query using a context-free grammar parsing tree. On receiving a search query from a client system associated with a user, the social-networking system may parse the query to identify particular unique entities referenced in the search query and tag any identified entities (e.g., linking the identified n-grams to a unique identifier for the referenced entity in the social-networking system). This process, referred to as "entity linking," may help improve the accuracy of subsequent steps. The social-networking system may check the search query against a so-called "whitelist" to see if the search query matches any pre-stored grammar query templates. The social-networking system may maintain a list of popular query templates and their respective query commands. If the search query matches a template in the whitelist, the social-networking system may translate the search query to a query command based on the corresponding query command stored in the whitelist and the entities tagged in the query. The whitelist process may help reduce translation time and computing cost. For a search query that does not match to any template in the whitelist, the social-networking system may check whether the query is a grammar query or not with a classifier neural network, such as a Long Short-Term Memory (LSTM) classification model. The social-networking system may construct term embeddings corresponding to the search query and process the term embeddings with the classifier neural network that produces a binary result indicating whether the search query is a grammar query or not. The classification process may improve the efficiency of query processing by reducing over-triggering and under-triggering, where over-triggering occurs when the social-networking system parses a query using the grammar model when the query is not a grammar query and under-triggering occurs when the social-networking system fails to parse a query using the grammar model when the query is a grammar query. If the query is classified as a grammar query, the social-networking system may map the query directly to an executable query command using an embedding-based translation model without relying on templates or context-free grammar models. The social-networking system may process the constructed term embeddings with a translator neural network implementing the translation model. The translator neural network may produce a query command after processing the input term embeddings. As an example and not by way of limitation, the social-networking system may receive a search query "photos of Haixun" from a client system associated with a user. The social-networking system may tag Haixun as a user with a particular entity identifier assigned to Haixun in the online social network. The social-networking system may translate the query into "photos(Haixun)" during the whitelist checking stage because "photos of <user>" is a stored template in the whitelist. As another example and not by way of limitation, the social-networking system may receive a search query "my friends who like swimming" from a client system associated with a user. The social-networking system may tag swimming as an exercise activity with a particular entity identifier assigned to the concept "swimming" in a social graph. The social-networking system may not find a matched template in the whitelist for the search query "my friends who like swimming." The social-networking system may construct term embeddings for the search query and process the term embeddings with a classifier neural network to determine whether the search query is a grammar query. As the classifier neural network returns "Yes", the social-networking system may map the term embeddings to a query command (intersect(friends(me), like(swimming)) using a translator neural network that implements an embedding-based translation model. As yet another example and not by way of limitation, a query "San Francisco Giants" may be tagged as a professional baseball team with a particular entity identifier assigned to the team in the social graph during the entity linking process. But, the classification procedure may determine that the query is a non-grammar query because the query is a simple query that only contains keywords (also referred to as a "keyword query").

In particular embodiments, the social-networking system may receive a search query comprising one or more n-grams from a client system associated with a user of an online social network. The social-networking system may determine whether the search query is a non-grammar query by checking if the search query comprises only a unigram or the search query is a pre-identified query. In particular embodiments, the social-networking system may parse the search query to identify one or more unique entities associated with the online social network referenced in the search query. The unique entities may be, for example, entities represented by nodes in a social graph that comprises a plurality of nodes and a plurality of edges connecting nodes. The one or more unique entities may be associated with respective entity types and identified by respective unique identifiers in the online social network. Identifying a unique entity referenced in the search query may comprise associating one or more n-grams in the search query referencing the entity with a unique identifier assigned to the entity in the online social network. In particular embodiments, the social-networking system may identify the one or more unique entities based at least in part on unique entities identified in a text corpus collected from third-party sources, unique entities identified in a text corpus collected from posts of the online social network users, or unique entities identified in a user-specific information received from the client system. The user-specific information may be cached information on the client system comprising information associated with friends of the user. In particular embodiments, the social-networking system may determine whether the search query matches any of the grammar templates in the index by checking the search query against an index of grammar templates. The index of grammar templates may be a collection of popular grammar queries, which may be updated on a periodic basis. In order to determine whether the search query matches any of the grammar templates in the index, the social-networking system may transform the search query by replacing each n-gram in the search query referencing a unique entity with a non-terminal token for the respective entity type associated with the referenced entity and identify a template that matches the transformed search query in the index of templates. In particular embodiments, the social-networking system may generate one or more term embeddings representing the one or more n-grams of the search query, respectively, using a word embedding model. Each term embedding may be a point in a d-dimensional embedding space. Each term embedding for an n-gram referencing one of the unique entities may be a term embedding for the respective unique entity. The word embedding model may be, for example, a word2vec model. In particular embodiments, the social-networking system may determine whether the search query is a grammar query by processing the one or more term embeddings with a classifier neural network. The classifier neural network may be a Long Short-Term Memory (LSTM) network that may take the one or more term embeddings representing the one or more n-grams of the search query as an input and calculate a probability that the search query is a grammar query. The social-networking system may determine the search query is a grammar query if the calculated probability is greater than or equal to a threshold probability. In particular embodiments, the social-networking system may construct a query command corresponding to the search query if the search query is determined as a grammar query. The social-networking system may then execute the query command to retrieve one or more search results. In particular embodiments, the social-networking system may send instructions for generating a search-results interface for presentation to the user to the client system in response to the search query. The search-results interface may comprise one or more of the retrieved search results.

In particular embodiments, the social-networking system may train the classifier neural network with positive data and negative data, where the positive data is a set of known grammar queries and the negative data is a set of known non-grammar queries. The social-networking system may generate the positive data from a set of context-free grammar rules. Context-free grammar rules are production rules that describe all possible strings in a formal language, where the formal language comprises a set of strings of symbols and a set of rules that are specific to the language. The social-networking system may also generate the positive data by accessing logged queries from a data store of the online social network, where the accessed queries partially match any context-free grammar rule of a set of context-free grammar rules. The social-networking system may generate the negative data by formulating one or more queries that violate a set of context-free grammar rules. The social-networking system may also generate the negative data by accessing logged queries from a data store of the online social network, where the accessed queries violate a set of context-free grammar rules.

In particular embodiments, the social-networking system may receive a search query comprising one or more n-grams from a client system associated with a user of an online social network. The social-networking system may parse the search query to identify one or more unique entities associated with the online social network referenced in the search query. In particular embodiments, the social-networking system may generate, using a word embedding model, one or more term embeddings representing the one or more n-grams of the search query, respectively. Each term embedding may be a point in a d-dimensional embedding space. A term embedding for an n-gram referencing one of the unique entities may be a term embedding for the respective unique entity. In particular embodiments, the social-networking system may construct a query command corresponding to the search query by processing the term embeddings with a translator neural network. The translator neural network may be a Long Short-Term Memory (LSTM) network. In particular embodiments, the translator neural network may perform sequence to sequence (seq2seq) translation that requires two recurrent neural networks working together to transform one sequence to another. The translator neural network may comprise an encoding module and a decoding module. The encoding module may take the one or more term embeddings representing the one or more n-grams of the search query as an input. The decoding module may generate the one or more output term embeddings representing one or more query tokens for a query command. In particular embodiments, the translator neural network may comprise a number of memory units equal to a sum of a number of input term embeddings and a number of output term embeddings. The first k memory units of the translator neural network may belong to the encoding module, where k is the number of the input term embeddings. The last l memory units of the translator neural network may belong to the decoding module, where l is the number of the output term embeddings. In particular embodiments, the memory units in the encoding module may encode the input term embeddings into a query embedding. The query embedding may be a point in an n-dimensional embedding space. An i-th memory unit may receive an (i−1)st intermediary encoding query embedding from an (i−1)st memory unit. The i-th memory unit may generate an i-th intermediary encoding query embedding by processing the (i−1)st intermediary encoding query embedding and the i-th input term embedding with a first hidden-layer matrix. The i-th memory unit may forward the i-th intermediary encoding query embedding to an (i+1)st memory unit. In particular embodiments, the memory units in the decoding module may decode term embeddings for the query command from the query embedding received from the encoding module. A j-th memory unit may receive a (j−1)st intermediary decoding query embedding from a (j−1)st memory unit. The j-th memory unit may generate a j-th output term embedding and a j-th intermediary decoding query embedding by processing the received (j−1)st intermediary decoding query embedding with a second hidden-layer matrix. The j-th memory unit may send out the j-th output term embedding, and forward the j-th intermediary decoding query embedding to a (j+1)st memory unit. In particular embodiments, the number of input term embeddings may be upper-bounded by a first maximum vocabulary size. In particular embodiments, the number of output term embeddings may be upper-bounded by a second maximum vocabulary size. In particular embodiments, the social-networking system may encode the one or more term embeddings to generate a query embedding representing the search query by the translator neural network. In particular embodiments, the social-networking system may decode the query embedding to generate one or more output term embeddings representing one or more query tokens by the translator neural network. In particular embodiments, the social-networking system may construct a query command from the one or more output term embeddings generated by the translator neural network. The query command may comprise the one or more query tokens represented by the one or more output term embeddings. The social-networking system may then execute the query command to retrieve one or more search results. In particular embodiments, the social-networking system may send instructions for generating a search-results interface for presentation to the user to the client system in response to the search query. The search-results interface may comprise one or more of the retrieved search results. In particular embodiments, the translator neural network may be trained with training data comprising a plurality of a natural language query and a corresponding query command pairs. In particular embodiments, the plurality of pairs may be generated from context-free grammar rules, where the context-free grammar rules are production rules that describe all possible strings in a formal language, where the formal language comprises a set of strings of symbols and a set of rules that are specific to the language. In particular embodiments, the plurality of pairs may be generated by accessing logged queries from a data store of the online social network, where a query command for a given natural-language query may be constructed by a context-free grammar parser. In particular embodiments, the translator neural network may construct identical query commands for a plurality of paraphrased search queries that are represented by similar term embeddings. The translator neural network may construct a query command for a search query in any language that has corresponding term embeddings available.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
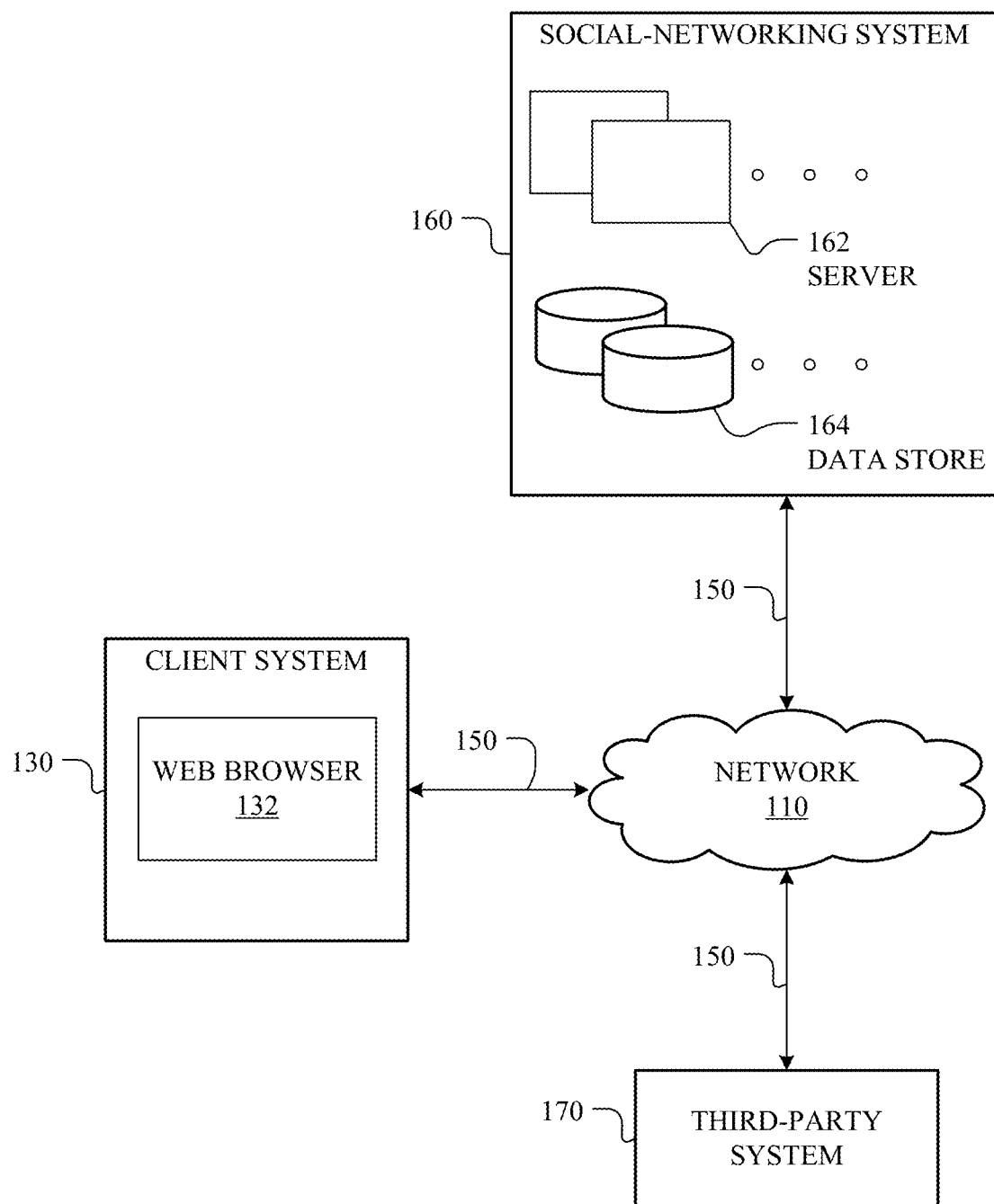
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
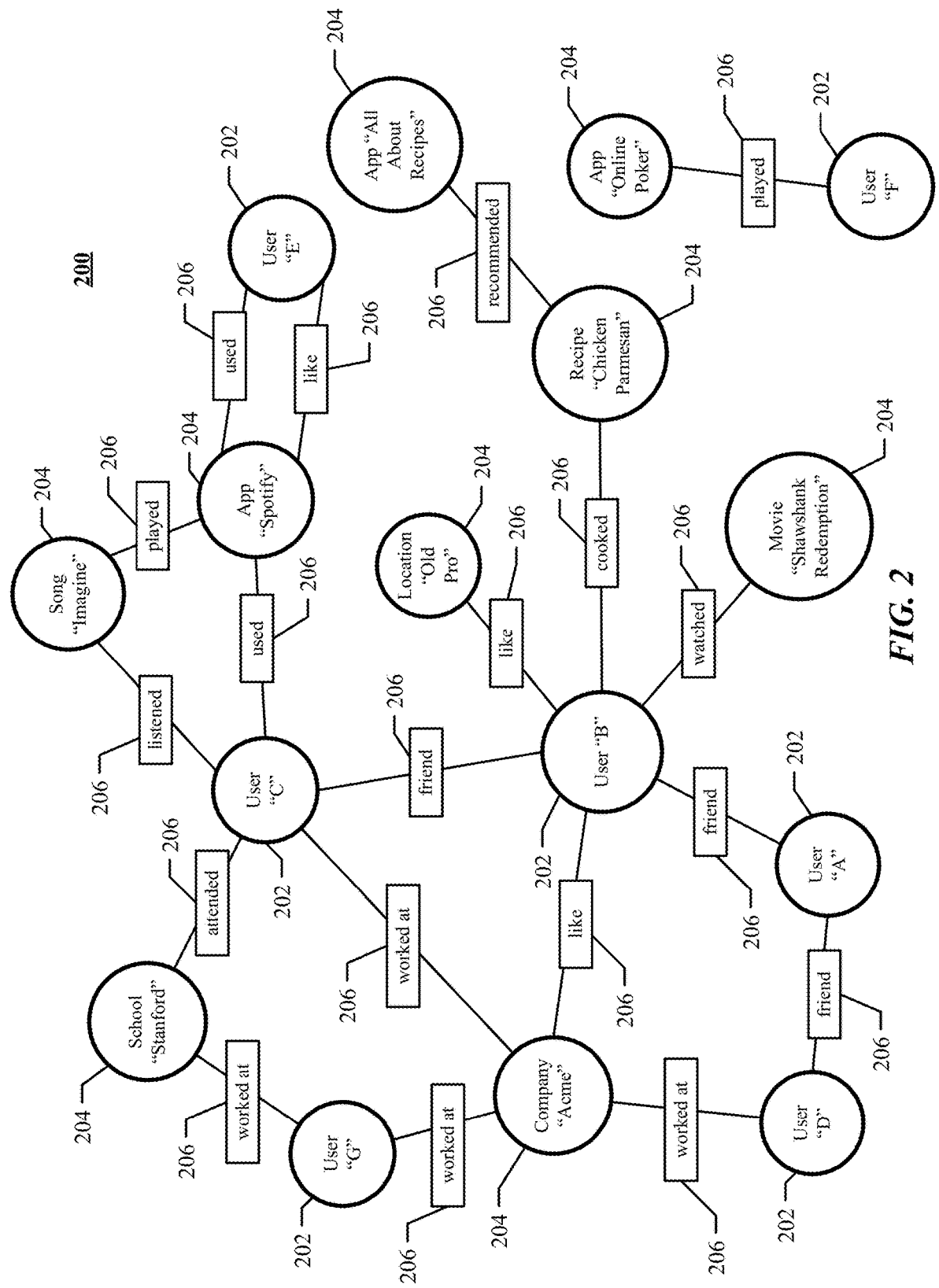
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Vector Spaces and Embeddings

Figure 3:
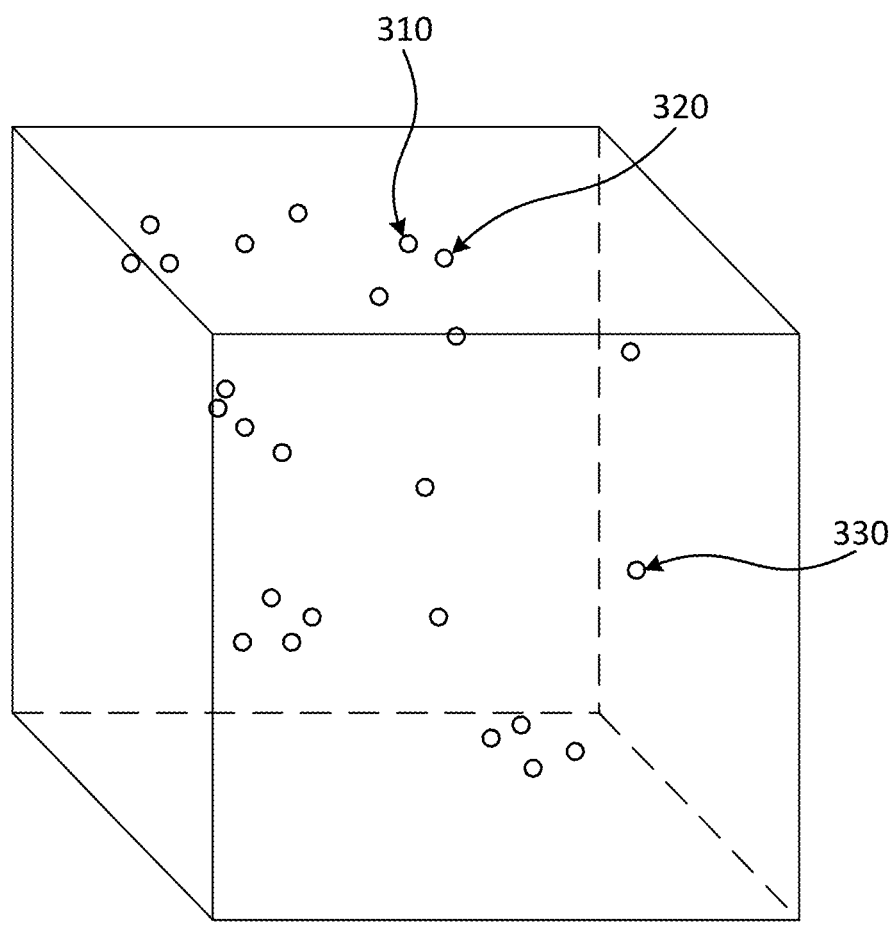
FIG. 3 illustrates an example view of an embedding space.

FIG. 3 illustrates an example view of a vector space 300. In particular embodiments, an object or an n-gram may be represented in a d-dimensional vector space, where d denotes any suitable number of dimensions. Although the vector space 300 is illustrated as a three-dimensional space, this is for illustrative purposes only, as the vector space 300 may be of any suitable dimension. In particular embodiments, an n-gram may be represented in the vector space 300 as a vector referred to as a term embedding. Each vector may comprise coordinates corresponding to a particular point in the vector space 300 (i.e., the terminal point of the vector). As an example and not by way of limitation, vectors 310, 320, and 330 may be represented as points in the vector space 300, as illustrated in FIG. 3. An n-gram may be mapped to a respective vector representation. As an example and not by way of limitation, n-grams $t_1$ and $t_2$ may be mapped to vectors $\vec{v_1}$ and $\vec{v_2}$ in the vector space 300, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 300. In particular embodiments, an n-gram may be mapped to a vector representation in the vector space 300 by using a machine leaning model (e.g., a neural network). The machine learning model may have been trained using a sequence of training data (e.g., a corpus of objects each comprising n-grams).

In particular embodiments, an object may be represented in the vector space 300 as a vector referred to as a feature vector or an object embedding. As an example and not by way of limitation, objects $e_1$ and $e_2$ may be mapped to vectors $\vec{v_1}$ and $\vec{v_2}$ in the vector space 300, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 300. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 300. As an example and not by way of limitation, vector 310 and vector 320 may correspond to objects that are more similar to one another than the objects corresponding to vector 310 and vector 330, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, U.S. patent application Ser. No. 15/365,789, filed 30 Nov. 2016, and U.S. patent application Ser. No. 15/365,797, filed 30 Nov. 2016, each of which is incorporated by reference.

Parsing and Classifying Search Queries

In particular embodiments, when a social-networking system 160 receives a search query from a client system 130 associated with a user, the social-networking system 160 may determine whether the search query is a grammar query or not. A "grammar query," as used herein, is a type of complex search query that references particular unique entities within the online social network (e.g., a structured query, as discussed previously). The grammar query can be translated into a query command, where the query command comprises one or more query constraints. A "non-grammar query," as used herein, is a search query that does not necessarily reference particular unique entities within the online social network, and may contain one or more keywords that are required to be in the search results returned when executing the query (e.g., a keyword query, as discussed previously). When the social-networking system 160 determines that the search query is a grammar query, the social-networking system 160 may map the query directly to an executable query command (e.g., an s-expression) using an embedding-based translation model without relying on templates or context-free grammar models. With the context-free grammar models, the social-networking system 160 may have constructed a query command by parsing the search query using a context-free grammar parsing tree. On receiving a search query from a client system 130 associated with a user, the social-networking system 160 may parse the query to identify particular unique entities referenced in the search query and tag any identified entities (e.g., linking the identified n-grams to a unique identifier for the referenced entity in the social-networking system 160). This process, referred to as "entity linking," may help improve the accuracy of subsequent steps. The social-networking system 160 may check the search query against a so-called "whitelist" to see if the search query matches any pre-stored grammar query templates. The social-networking system 160 may maintain a list of popular query templates and their respective query commands. If the search query matches a template in the whitelist, the social-networking system 160 may translate the search query to a query command based on the corresponding query command stored in the whitelist and the entities tagged in the query. The whitelist process may help reduce translation time and computing cost. For a search query that does not match to any template in the whitelist, the social-networking system 160 may check whether the query is a grammar query or not with a classifier neural network, such as a Long Short-Term Memory (LSTM) classification model. The social-networking system 160 may construct term embeddings corresponding to the search query and process the term embeddings with the classifier neural network that produces a binary result indicating whether the search query is a grammar query or not. The classification process may improve the efficiency of query processing by reducing over-triggering and under-triggering, where over-triggering occurs when the social-networking system 160 parses a query using the grammar model when the query is not a grammar query and under-triggering occurs when the social-networking system 160 fails to parse a query using the grammar model when the query is a grammar query. If the query is classified as a grammar query, the social-networking system 160 may map the query directly to an executable query command using an embedding-based translation model without relying on templates or context-free grammar models. The social-networking system 160 may process the constructed term embeddings with a translator neural network implementing the translation model. The translator neural network may produce a query command after processing the input term embeddings. As an example and not by way of limitation, the social-networking system 160 may receive a search query "photos of Haixun" from a client system 130 associated with a user. The social-networking system 160 may tag Haixun as a user with a particular entity identifier assigned to Haixun in the online social network. The social-networking system 160 may translate the query into "photos (Haixun)" during the whitelist checking stage because "photos of <user>" is a stored template in the whitelist. As another example and not by way of limitation, the social-networking system 160 may receive a search query "my friends who like swimming" from a client system 130 associated with a user. The social-networking system 160 may tag swimming as an exercise activity with a particular entity identifier assigned to the concept "swimming" in a social graph 200. The social-networking system 160 may not find a matched template in the whitelist for the search query "my friends who like swimming." The social-networking system 160 may construct term embeddings for the search query and process the term embeddings with a classifier neural network to determine whether the search query is a grammar query. As the classifier neural network returns "Yes," the social-networking system 160 may map the term embeddings to a query command (intersect(friends(me), like(swimming)) using a translator neural network that implements an embedding-based translation model. As yet another example and not by way of limitation, a query "San Francisco Giants" may be tagged as a professional baseball team with a particular entity identifier assigned to the team in the social graph during the entity linking process. But, the classification procedure may determine that the query is a non-grammar query because the query is a simple query that only contains keywords (also referred to as a "keyword query").

In particular embodiments, the social-networking system 160 may receive a search query comprising one or more n-grams from a client system 130 associated with a user of an online social network. The social-networking system 160 may determine whether the search query is a non-grammar query by checking if the search query comprises only a unigram or the search query is a pre-identified query. In particular embodiments, the social-networking system 160 may parse the search query to identify one or more unique entities associated with the online social network referenced in the search query. The unique entities may be, for example, entities represented by nodes in a social graph 200 that comprises a plurality of nodes and a plurality of edges connecting nodes. The one or more unique entities may be associated with respective entity types and identified by respective unique identifiers in the online social network. Identifying a unique entity referenced in the search query may comprise associating one or more n-grams in the search query referencing the entity with a unique identifier assigned to the entity in the online social network. In particular embodiments, the social-networking system 160 may identify the one or more unique entities based at least in part on unique entities identified in a text corpus collected from third-party sources, unique entities identified in a text corpus collected from posts of the online social network users, or unique entities identified in a user-specific information received from the client system 130. The user-specific information may be cached information on the client system 130 comprising information associated with friends of the user. In particular embodiments, the social-networking system 160 may determine whether the search query matches any of the grammar templates in the index by checking the search query against an index of grammar templates. The index of grammar templates may be a collection of popular grammar queries, which may be updated on a periodic basis. In order to determine whether the search query matches any of the grammar templates in the index, the social-networking system 160 may transform the search query by replacing each n-gram in the search query referencing a unique entity with a non-terminal token for the respective entity type associated with the referenced entity and identify a template that matches the transformed search query in the index of templates. In particular embodiments, the social-networking system 160 may generate one or more term embeddings representing the one or more n-grams of the search query, respectively, using a word embedding model. Each term embedding may be a point in a d-dimensional embedding space. Each term embedding for an n-gram referencing one of the unique entities may be a term embedding for the respective unique entity. The word embedding model may be, for example, a word2vec model. In particular embodiments, the social-networking system 160 may determine whether the search query is a grammar query by processing the one or more term embeddings with a classifier neural network. The classifier neural network may be a Long Short-Term Memory (LSTM) network that may take the one or more term embeddings representing the one or more n-grams of the search query as an input and calculate a probability that the search query is a grammar query. The social-networking system 160 may determine the search query is a grammar query if the calculated probability is greater than or equal to a threshold probability. In particular embodiments, the social-networking system 160 may construct a query command corresponding to the search query if the search query is determined as a grammar query. The social-networking system 160 may then execute the query command to retrieve one or more search results. In particular embodiments, the social-networking system 160 may send instructions for generating a search-results interface for presentation to the user to the client system 130 in response to the search query. The search-results interface may comprise one or more of the retrieved search results.

In particular embodiments, the social-networking system 160 may train the classifier neural network with positive data and negative data, where the positive data is a set of known grammar queries and the negative data is a set of known non-grammar queries. The social-networking system 160 may generate the positive data from a set of context-free grammar rules. Context-free grammar rules are production rules that describe all possible strings in a formal language, where the formal language comprises a set of strings of symbols and a set of rules that are specific to the language. The social-networking system 160 may also generate the positive data by accessing logged queries from a data store of the online social network, where the accessed queries partially match any context-free grammar rule of a set of context-free grammar rules. The social-networking system 160 may generate the negative data by formulating one or more queries that violate a set of context-free grammar rules. The social-networking system 160 may also generate the negative data by accessing logged queries from a data store of the online social network, where the accessed queries violate a set of context-free grammar rules.

More information on grammar models may be found in U.S. patent application Ser. No. 13/674,695, filed 12 Nov. 2012, and U.S. patent application Ser. No. 13/731,866, filed 31 Dec. 2012, which are incorporated by reference.

Figure 4A:
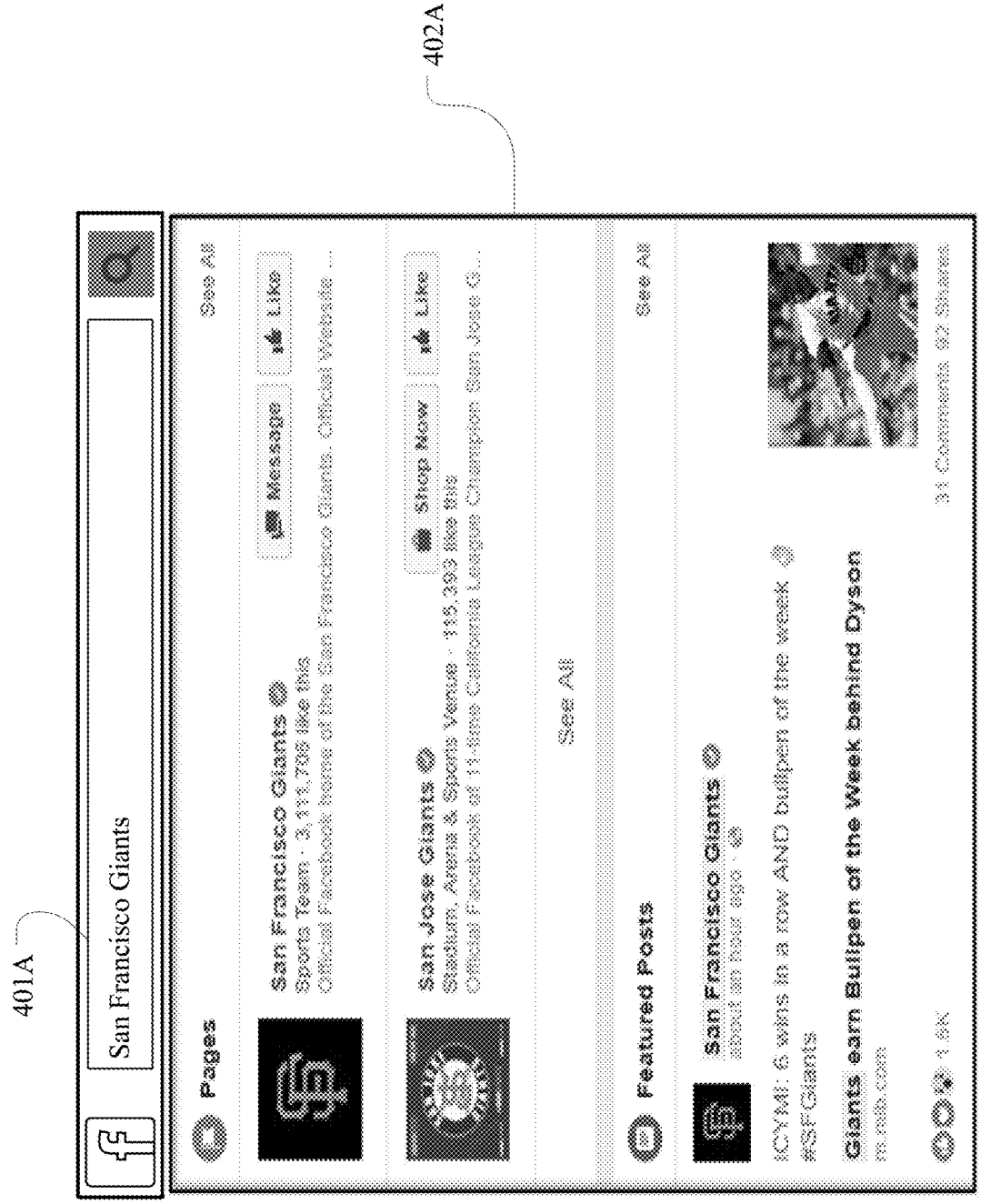
FIGS. 4A-4B illustrate example search queries on a client system.
Figure 4B:

FIGS. 4A-4B illustrate example search queries on a client system 130. In particular embodiments, the social-networking system 160 may receive a search query for objects of the online social network from a client system 130 of a user of an online social network. The search query may comprise one or more n-grams. As an example and not by way of limitation, referencing FIG. 4A, an online social network user Bob may input a query "San Francisco Giants" 401A into the search bar because Bob wants to see recent updates regarding a professional Major League Baseball team San Francisco Giants. The client system 130 of Bob may send the query 401A to the social-networking system 160. The social-networking system 160 may prepare the search results that match the keyword "San Francisco Giants". As another example and not by way of limitation, referencing FIG. 4B, another online social network user Alice may input a query "San Francisco events in July" 401B. The client system 130 associated with Alice may send the search query 401B to the social-networking system 160. The social-networking system 160 may parse the query 401B first to construct a query command and prepare the search results by executing the query command. The search results should be events occur in a particular location (i.e., in the city of San Francisco) and in a particular duration of time (i.e., in a month of July, 2017). A grammar query specifies a condition for the search results to meet in natural language. The search query from Alice is a grammar query while the search query from Bob is a non-grammar query. A grammar query may be translated into a query command (e.g., a Structural Query Language (SQL)-like query expression). The examples of grammar query may include, but not limited to, "photos taken in 2016", "friends working at Facebook", "my friends posts I liked", "schools Haixun attended", and "groups I joined." A non-grammar query is a typeahead search query or a search query with one or more keywords that requires the search results being related with the one or more keywords. Although this disclosure describes receiving a search query in a particular manner, this disclosure contemplates receiving a search query in any suitable manner.

Figure 5:
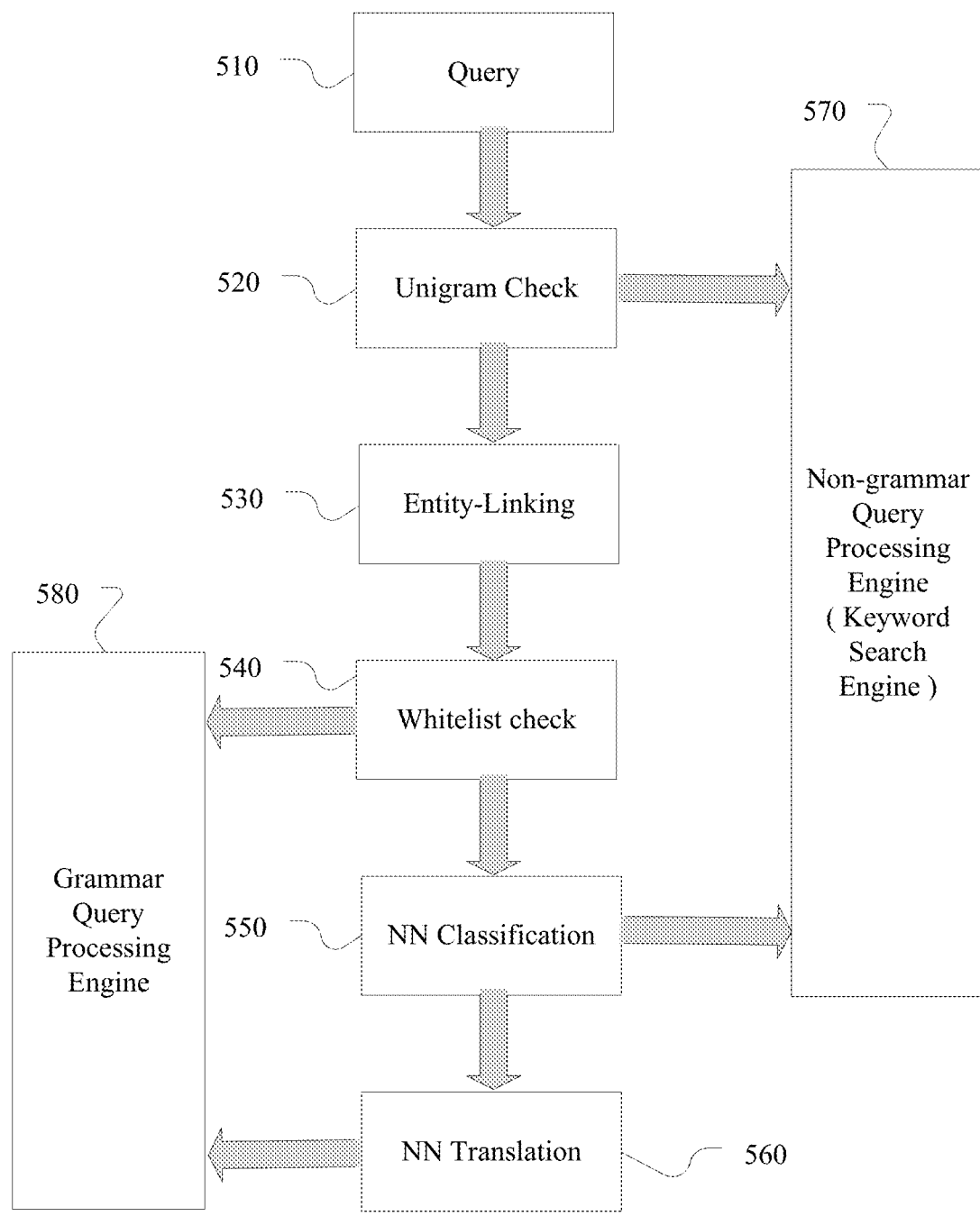
FIG. 5 illustrates an overview of a search query processing pipeline.

FIG. 5 illustrates an overview of a search query processing pipeline. On receiving a search query 510 from a client system 130, the social-networking system 160 may perform a unigram check 520. During the unigram check 520, the social-networking system 160 may classify the search query 510 as a non-grammar query if the search query comprises only a unigram or the search query is a pre-identified query. The social-networking system 160 may process the query 510 by a non-grammar query processing engine (e.g., a standard keyword search engine) 570 if the search query is classified as a non-grammar query. If the search query 510 is not classified as a non-grammar query during the unigram check 520, the social-networking system 160 may perform an entity linking process 530, where the social-networking system 160 may parse the search query to identify one or more unique entities associated with the online social network referenced in the search query. The unique entities may be entities represented by nodes in a social graph 200. After that, the social-networking system 160 may perform a whitelist check 540, where the social-networking system 160 may determine whether the search query matches any of the grammar templates in the index by checking the search query against an index of grammar templates. The social-networking system 160 may construct a query command corresponding to the search query 510 and execute the query command by a grammar query processing engine 580 if the search query 510 matches a template. As the whitelist check 540 may be much faster than a neural network based classification 550 or a neural network based translation 560, the whitelist check 540 may save the query process time considerably. Experiments show that 99% of grammar queries match templates during the whitelist check 540. If the search query 510 does not match any template during the whitelist check 540, the social-networking system 160 may classify the search query 510 by performing a neural network based classification 550. If the search query 510 is classified as a non-grammar query in the neural network based classification 550, the social-networking system 160 may process the search query with the non-grammar query processing engine 570. If the search query 510 is classified as a grammar query in the neural network based classification 550, the social-networking system 160 may translate the search query 510 into a query command by performing a neural network based translation 560 and process the search query 510 with the grammar query processing engine 580. Although this disclosure describes processing a search query in a particular manner, this disclosure contemplates processing a search query in any suitable manner.

In particular embodiments, the social-networking system 160 may determine whether the search query is a non-grammar query by checking if the search query comprises only a unigram or the search query is a pre-identified query during the unigram check 520. A unigram search query cannot be a grammar query because a query constraint cannot be specified by only a unigram. A search query that comprises only a unigram (e.g., "Beyoncé" or "Haixun") is likely an entity name, in which case the typeahead processes described previously will identify entities having names matching the unigram and provide those as typeahead search results. Likewise, a search query with a pre-indexed n-gram (e.g., "White House") may not be a grammar query. Thus, the social-networking system 160 may classify a search query as a non-grammar query if the search query comprises only a unigram or the search query is a pre-identified query. In particular embodiments, the social-networking system 160 may process the classified non-grammar query by a non-grammar query processing search engine without further analyzing the search query. Because classifying a search query as a non-grammar query by processing term embeddings with a neural network may require considerable computing power and computing time, the unigram check may save the computing resources significantly for search queries with unigram or well-known n-grams. Experiments show that about 77% of total search queries are classified as a non-grammar queries during the unigram check. As an example and not by way of limitation, the social-networking system 160 may receive a search query "California" from a client system 130. Because the query is a unigram query, the social-networking system 160 may classify the query as a non-grammar query and process the query by a non-grammar query processing search engine 570, also known as a keyword search engine. As another example and not by way of limitation, the social-networking system 160 may receive a search query "San Francisco Giants," as in FIG. 4A. The social-networking system 160 may look up "San Francisco Giants" in a list of pre-identified n-grams. The list of pre-identified n-grams may comprise well-known entity names in the online social network and entity names within a pre-determined degree of separation from the querying user in the social-graph 200. Because "San Francisco Giants" matches an element in the list, the social-networking system 160 may process the query by a non-grammar query processing search engine 570. The social-networking system 160 may send, to the client system 130 in response to the search query 401A, instructions for generating a search-results interface for presentation to the user. The search-results interface 402A may comprise references to one or more of the objects of the online social network presented in ranked order. The search-results interface 402A may have an interface for the user to see more results with lower ranks. Although this disclosure describes classifying a unigram or a pre-identified n-gram search query as a non-grammar query in a particular manner, this disclosure contemplates classifying a unigram or a pre-identified n-gram search query as a non-grammar query in any suitable manner.

In particular embodiments, the social-networking system 160 may parse the search query to identify one or more unique entities associated with the online social network referenced in the search query during an entity linking process 530. A unique entity may be an entity represented by a node in a social graph 200 or a significant topic (e.g., a trending topic) such as "2016 Presidential Election," which may not be represented by a node in the social-graph 200. The social graph 200 may comprise a plurality of nodes and a plurality of edges connecting nodes. A social graph entity may be identified by a unique identifier in the online social network and associated with an entity type. Identifying a unique entity referenced in the search query may comprise associating one or more n-grams in the search query referencing the entity with a unique identifier assigned to the entity in the online social network. The process of identifying unique entities may also be referred to as tagging. As an example and not by way of limitation, the social-networking system 160 may receive a search query "friends who graduated from Stanford." The social-networking system 160 may identify 'Stanford' in the search query as a social graph entity. In the social graph managed by the social-networking system, 'Stanford' may be a city in California or a university. Based on the context of the search query, the social-networking system 160 may tag 'Stanford' as a university, and may link the unigram 'Stanford' to the unique entity identifier (ID) for Stanford University in the social graph 200. To be able to unambiguously identify social graph entities, the social-networking system 160 may collect text corpus from various sources for the entity linking process 530. As another example and not by way of limitation, the social-networking system 160 may receive a search query "photos of Haixun" from a client system 130 associated with Bo Zeng, an online social network user. The social-networking system 160 may tag 'Haixun' as "Haixun Wang", a friend of Bo based on the cached information received from the client system 130. Although this disclosure describes identifying entities referenced in the search query in a particular manner, this disclosure contemplates identifying entities referenced in the search query in any suitable manner.

Figure 6:
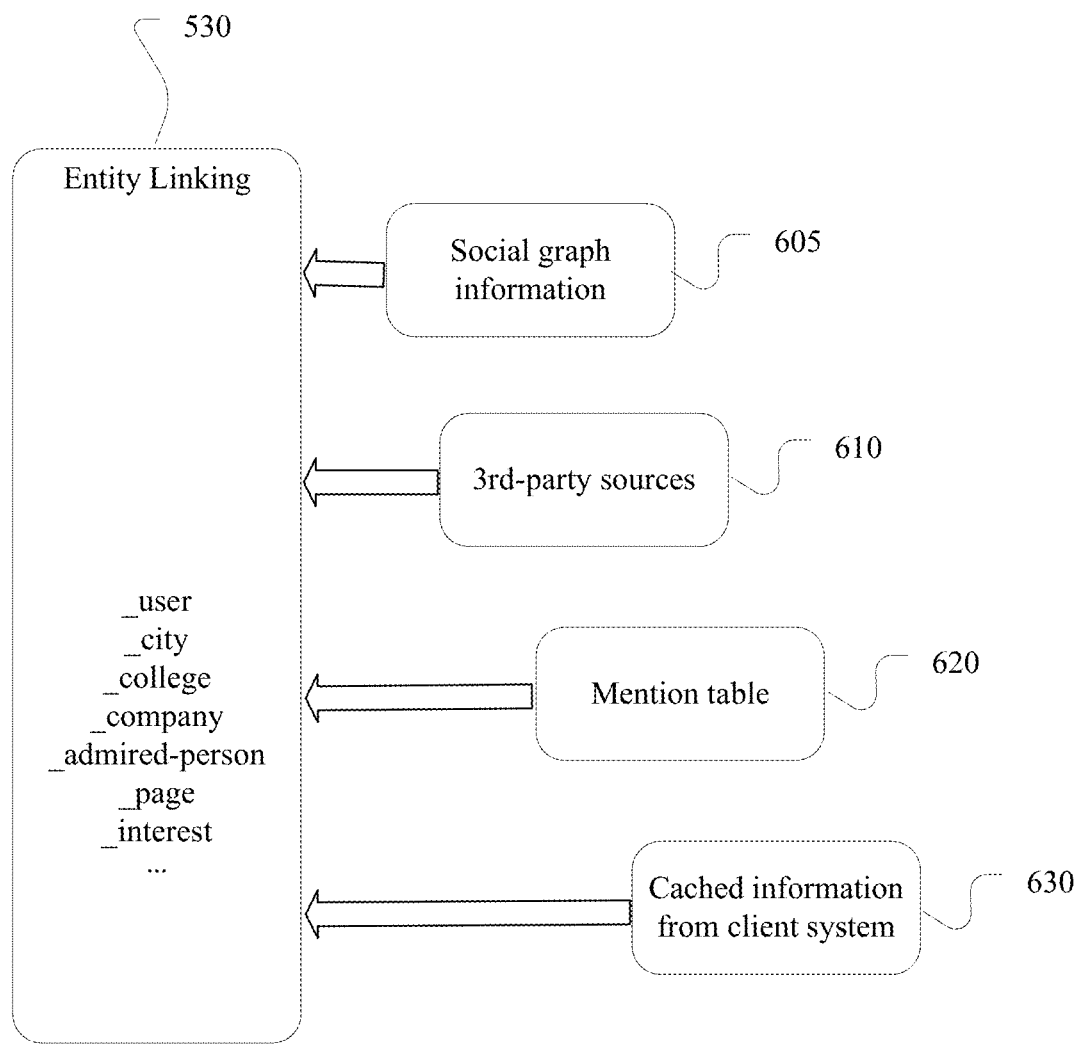
FIG. 6 illustrates an example entity linking system.

FIG. 6 illustrates an example entity linking system. In particular embodiments, in response to a search query, an entity linking process 530 of the entity linking system may parse the search query and identify portions of the search query that correspond to particular unique entities associated with the online social network. However, in some cases a query may include one or more terms that are ambiguous, where an ambiguous term is a term that may possibly correspond to multiple entities. To parse the ambiguous term, the entity linking process 530 may access one or more of social graph information 605, text corpus from third-party sources 610, a mention table 620 of the online social network, cached information 630 from the client systems 130, or any combination thereof, as part of a contextual analysis of the query terms to identify which unique entity corresponds to the ambiguous n-grams from the search query. This may be useful when the entity linking system cannot unambiguously identify which unique entity corresponds to a particular n-gram in a search query. By analyzing other n-grams in the search query and comparing it to information from the social graph 200, third-party sources 610, a mention table 620, or cached information 630, the entity linking process 530 may be able to more accurately determine which unique entity is being referenced by a particular n-gram. In particular embodiments, the social-networking system 160 may tag any unique entities (e.g., social graph entities, trending topics) referenced in the search query based on unique entities identified in a text corpus collected from third-party sources 610. In particular embodiments, the social-networking system 160 may tag any entities referenced in the search query based on unique entities identified in a text corpus collected from posts or other content of the online social network. The text corpus collected from the posts/content of the online social network may be compiled in a mention table 620. A number of unique entities may be referred by an n-gram. Also, a number of different n-grams may indicate a unique entity. Unambiguously determining what unique entity is referenced by a particular n-gram may be achieved by a contextual analysis based on a large corpus of text. With the contextual analysis based on the collected text corpus from various sources, the social-networking system 160 may be able to link entities unambiguously. As an example and not by way of limitation, the social-networking system 160 may collect text corpus from Wikipedia, an online encyclopedia, written collaboratively by the users. On receiving a search query "friends living in San Francisco and working at Facebook," the social-networking system 160 may tag 'San Francisco' as a city in California and 'Facebook' as an employer based on the context of the search query analyzed based on entities identified in a text corpus collected from Wikipedia, wherein the city 'San Francisco' is associated with the term 'living,' and the employer 'Facebook' is associated with the term 'working' within the text corpus. As another example and not by way of limitation, the social-networking system 160 may collect text corpus from recently created posts in the online social network. On receiving a search query "Warriors players under 30," where the term 'Warriors' could correspond to the Golden State Warriors, a professional basketball team in National Basketball Association, or to a television show titled "Warriors," the social-networking system 160 may determine the reference to 'Warriors' in the query should be linked to the basketball team based on entities identified in a text corpus collected from the posts, where the basketball team is associated with the term 'players' in the text corpus, but the term 'players' is not associated with the television show. Although this disclosure describes identifying entities in the search query based on entities identified in the text corpus collected from various sources in a particular manner, this disclosure contemplates identifying entities in the search query based on entities identified in the text corpus collected from various sources in any suitable manner.

In particular embodiments, the social-networking system 160 may identify any entities referenced in the search query based on unique entities identified in a user-specific information received from the client system 130 of the user. When a client system 130 sends a search query to the social-networking system 160, the client system 130 may also include user-specific information cached on the client system 130 to the social-networking system 160. The cached user-specific information may comprise profile information of friends of the user including names. The social-networking system 160 may tag any entities referenced in the search query based on entities identified in a user-specific information received from the client system 130. As an example and not by way of limitation, the social-networking system 160 may receive a search query "Photos Haixun posted last year" from a client system 130 associated with Bo Zeng, a user of the online social network. The social-networking system 160 may also receive user-specific information of Bo Zeng cached on the client system 130 along with the search query. The user-specific information may comprise information associated with Bo's friends including their first names. Based on the user-specific information from the client system 130, the social-networking system 160 may tag 'Haixun' in the search query to 'Haixun Wang,' a friend of Bo Zeng. Although this disclosure describes identifying any entities in a search query based on information received from the client system in a particular manner, this disclosure contemplates identifying any entities in a search query based on information received from the client system in any suitable manner.

More information on identifying entities referenced in queries may be found in U.S. patent application Ser. No. 13/556,072, filed 23 Jul. 2012, and U.S. patent application Ser. No. 13/732,101, filed 31 Dec. 2012, which are incorporated by reference.

More information on entity linking and trending topics may be found in U.S. patent application Ser. No. 14/858,366, filed 18 Sep. 2015, and U.S. patent application Ser. No. 15/355,500, filed 18 Nov. 2016, which are incorporated by reference.

In particular embodiments, the social-networking system 160 may determine whether the search query matches any of the grammar templates in the index by checking the search query against an index of grammar templates during a whitelist check 540. The index of grammar templates may also be referred to as a whitelist. The index of grammar templates may be a collection of popular grammar queries, the index being updated on a periodic basis. Experiments show that about 99% of grammar queries match entries in the whitelist, respectively. Because the whitelist check 540 may be considerably faster than a neural network based query classification 550 or neural network based query translation 560 and most of the grammar queries may be translated in the whitelist check 540, the whitelist check 540 may contribute saving computing resources and time significantly. As an example and not by way of limitation, the social-networking system 160 may receive a search query "photos of Haixun." After tagging the search query, the social-networking system 160 may find a matching template "photos of <user>" in the index of grammar templates for the given search query. The whitelisted queries may be indexed with their corresponding query command. The social-networking system 160 may construct a query command (photos(Haixun)) corresponding to the query "photos of Haixun" based on a cached query command (photos (<user>)) corresponding to the template "photos of <user>." As another example and not by way of limitation, the social-networking system 160 may receive a search query "friends in San Francisco." The social-networking system 160 may have identified 'San Francisco' as a city in California during the entity linking process 530, thereby linking the n-gram "San Francisco" in the query with the unique entity identifier for the entity "San Francisco" represented by a concept node 204 in the social graph 200. The social-networking system 160 may find "friends in <city>" in the index of grammar templates matching the given query and construct a query command (intersect(friends(me), live_in (San Francisco))) corresponding to the given query "friends in San Francisco" based on a cached query command (intersect(friends(me), live_in(<city>))) corresponding to a template "friends in <city>." Although this disclosure describes constructing a query command corresponding to a query based on an index of grammar templates in a particular manner, this disclosure contemplates constructing a query command corresponding to a query based on an index of grammar templates in any suitable manner.

In particular embodiments, in order to determine whether the search query matches any of the grammar templates in the index, the social-networking system 160 may transform the search query by replacing each n-gram in the search query referencing a unique entity with a non-terminal token for the respective entity type associated with the referenced entity and identify a template that matches the transformed search query in the index of templates. In particular embodiments, if a template that matches the transformed search query is found, the social-networking system 160 may construct a query command by applying the template to the search query. The constructed query command may comprise one or more query constraints. As an example and not by way of limitation, continuing with a prior example, the social-networking system 160 may replace 'Haixun' with '_user' after tagging the search query "photos of Haixun." The social-networking system 160 may look up the list of templates matching the replaced search query. the social-networking system 160 may find a matching template "photos of <user>" from the index. The social-networking system 160 may construct a query command (photos(Haixun)) based on the query command (photos(<user>)) cached along with the template "photos of <user>." As an example and not by way of limitation, continuing with another prior example, the social-networking system 160 may transform the search query "friends in San Francisco" into "friends in _city" after tagging the search query. The social-networking system 160 may find "friends in <city>" in the index of grammar templates and construct (intersect(friends(me), live_in(San Francisco))) based on the cached query command template. Although this disclosure describes constructing a query command based on an index of grammar templates in a particular manner, this disclosure contemplates constructing a query command based on an index of grammar templates in any suitable manner.

In particular embodiments, the social-networking system 160 may retrieve search results without further analyzing the search query by processing the query command with a grammar query processing engine 580 if the social-networking system 160 constructed a query command during the whitelist check 540. The grammar query processing engine 580 may execute the query command to identify social graph entities that match the search query. The grammar query processing engine 580 may rank the identified social graph entities based on pre-determined rules and return the ranked social graph entities as search results. The social-networking system 160 may send, to the client system 130 in response to the search query, instructions for generating a search-results interface for presentation to the querying user. The search-results interface may comprise references to one or more of the objects of the online social network presented in ranked order. As an example and not by way of limitation, continuing with the prior example, the social-networking system 160 may process the query command (intersect(friends(me), live_in(San Francisco))) with a grammar query processing engine 580. The grammar query processing engine 580 may execute the query command to find the social graph entities that match the conditions the query command specifies. The search results may comprise users of the online social network who are friends of the querying user and live in the city of San Francisco. The grammar query processing engine may rank the results, for example, based on the number of message exchanges with the querying user in the last pre-determined period of time. The social-networking system 160 may generate a search-results interface that may comprises references to the time-lines of the matching users and send the search-results interface to the client system 130. Although this disclosure describes processing a search query that matches an element in the whitelist in a particular manner, this disclosure contemplates processing a search query that matches an element in the whitelist in any suitable manner.

In particular embodiments, if a template matching the transformed search query was not found at the whitelist check 540, the social-networking system 160 may generate one or more term embeddings representing the one or more n-grams of the search query, respectively, using a word embedding model. Each term embedding may be a point in a d-dimensional embedding space. Each term embedding for an n-gram referencing one of the unique entities may be a term embedding for the respective unique entity. In particular embodiments, the word embedding model may be word2vec model. As an example and not by way of limitation, the social-networking system 160 may generate term embeddings for a search query "my friends who like swimming." During the entity linking process 530, the social-networking system 160 may have tagged 'swimming' as a sports activity identified by a unique identifier in the social graph. When the social-networking system 160 generates the term embeddings, the social-networking system 160 may use a term embedding assigned to the social graph entity 'swimming' instead of generating an embedding based on the word2vec model. As another example and not by way of limitation, the social-networking system 160 may generate word embeddings for a search query "photos Haixun liked last year" using the word2vec model. Because the social-networking system 160 may have tagged 'Haixun' to a user 'Haixun Wang' during the entity linking process 530, the social-networking system 160 may use a term embedding assigned to the user 'Haixun Wang' instead of generating a term embedding for 'Haixun' based on the word2vec model. Although this disclosure describes generating word embeddings in a particular manner, this disclosure contemplates generating word embeddings in any suitable manner.

Figure 7:
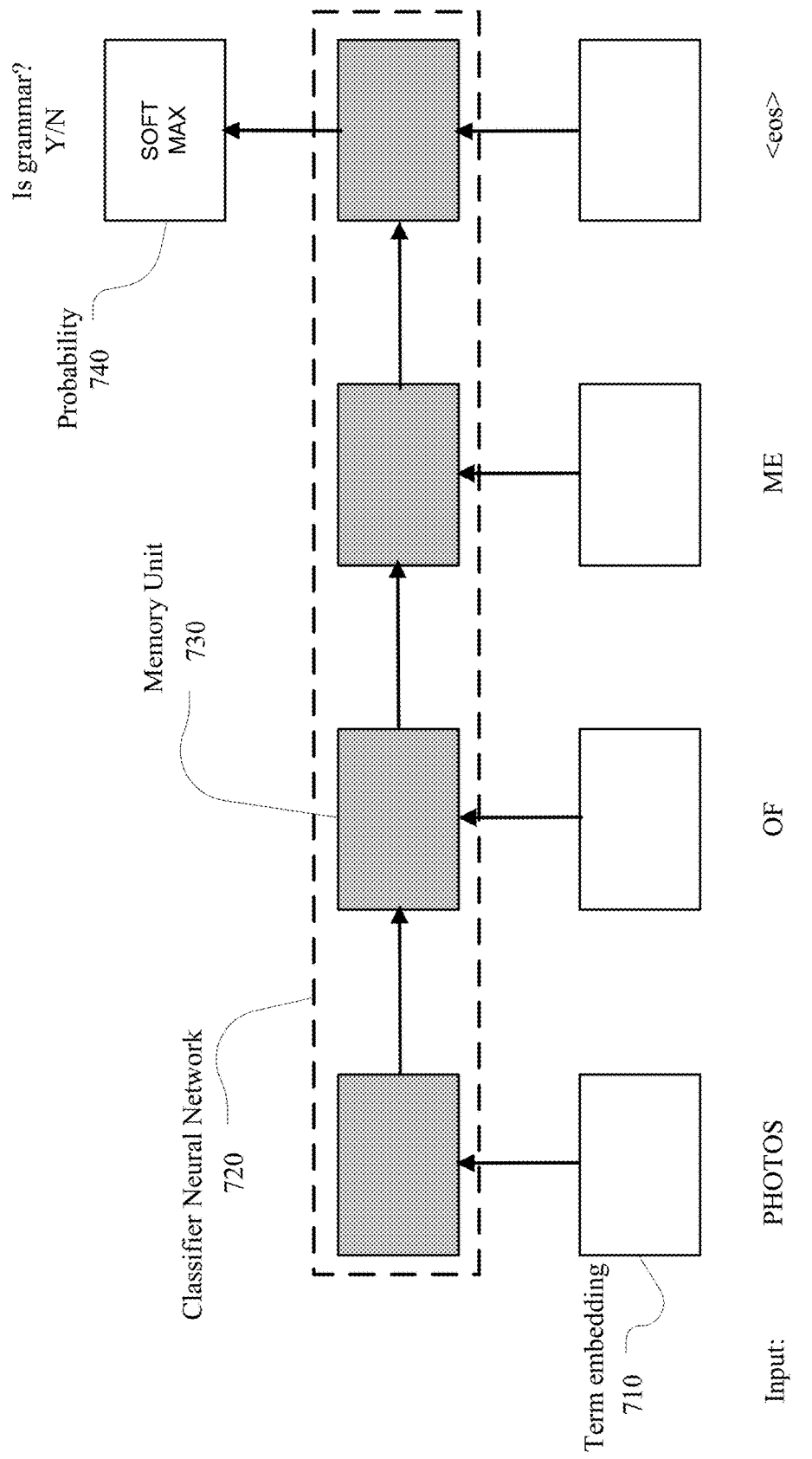
FIG. 7 illustrates an example of classifying a search query with a classifier neural network.

In particular embodiments, the social-networking system 160 may determine whether the search query is a grammar query by processing the term embeddings with a classifier neural network. A grammar query is a type of search query that can be translated into a query command, where the query command comprises one or more query constraints. In particular embodiments, the classifier neural network may be a Long Short-Term Memory (LSTM) network. The classifier neural network may take the one or more term embeddings representing the one or more n-grams of the search query as an input and calculate a probability that the search query is a grammar query. The classifier neural network may comprise as many memory units as the number of input term embeddings. An i-th memory unit may take an i-th term embedding and an (i−1)st output vector from an (i−1)st memory unit as inputs. The i-th memory unit may process both i-th term embedding and (i−1)st output vector with a hidden-layer matrix and produce an i-th output vector. The i-th memory unit may forward the i-th output vector to an (i+1)st memory unit. The hidden-layer matrix in the memory unit may be constructed as a result of training the classifier neural network with a set of training data. When k is the number of memory units in the neural network, the last memory unit (i.e., the k-th memory unit) may take a k-th term embedding and a (k−1)st output vector from a (k−1)st memory unit as inputs and processing the inputs with a hidden-layer matrix to produce the k-th output vector. The classifier neural network may calculate a probability that the search query represented by the input term embeddings is a grammar query by comparing the final output with the output of the training data. The social-networking system 160 may determine the search query is a grammar query if the calculated probability is greater than or equal to a threshold probability. Otherwise, the social-networking system 160 may determine that the search query is a non-grammar query. FIG. 7 illustrates an example process of classifying a search query with a classifier neural network. As an example and not by way of limitation, illustrated in FIG. 7, the social-networking system 160 may provide term embeddings 710 for a given search query "photos of me" to a classifier neural network 720. The classifier neural network 720 in this example may comprise four memory units 730. The fourth memory unit may take the output vector from the third memory unit and a term embedding representing an "end of sentence" symbol and produces the final output vector. The classifier neural network 720 may calculate a probability that the given search query "photos of me" is a grammar query by comparing the final output vector with the output vectors produced based on training data. The social-networking system 160 may determine that the given search query "photos of me" is a grammar query because the produced probability exceeds the threshold. Although this disclosure describes classifying a search query using a classifier neural network in a particular manner, this disclosure contemplates classifying a search query using a classifier neural network in any suitable manner.

In particular embodiments, the social-networking system 160 may train the classifier neural network 720 with positive data and negative data, where the positive data is a set of known grammar queries and the negative data is a set of known non-grammar queries. Because the classifier neural network 720 is supposed to distinguish grammar queries from non-grammar queries, the neural network may need to be trained with both positive data and negative data. In particular embodiments, the social-networking system 160 may generate the positive data from a set of a plurality of context-free grammar rules. The context-free grammar rules are production rules that describe all possible strings in a formal language, where a formal language comprises a set of strings of symbols and a set of rules that are specific to the language. As an example and not by way of limitation, the social-networking system 160 may generate a set of grammar queries including "my photos," "my friends photos," "my girlfriends photos," "my daughter photos," and "<user> photos" from a context-free grammar rules as follow:

| | |
|---|---|
| [S] -> | [person] photos |
| [person] -> | my |
| [person] -> | my friends |
| [person] -> | my girlfriends |
| [person] -> | my daughter |
| [person] -> | <user> |

In the context-free grammar rules above, the grammar generates a query "[person] photos", where [person] is a non-terminal token that can be replaced by any of various terminal tokens including 'my,' 'my friends,' 'my girlfriends,'. 'my daughter,' and one or more non-terminal tokens including <user>, where <user> is an entity with a unique identifier in the online social network. In particular embodiments, the social-networking system 160 may generate the positive data by accessing logged queries from a data store of the online social network, where the accessed queries partially match any context-free grammar rule of a set of context-free grammar rules. In particular embodiments, the social-networking system 160 may generate the positive data by accessing logged queries from third-party sources. The corpus of data may include queries that partially match context-free grammar rules. As an example and not by way of limitation, continuing from the prior example, the social-networking system 160 may collect a query "my uncle's photos" from a third-party sources. Though this query does not fully match the context-free grammar rules shown above, the query is a grammar query. In particular embodiments, the social-networking system 160 may train the classifier neural network with the negative data generated by formulating one or more queries that violate a set of context-free grammar rules. As an example and not by way of limitation, the social-networking system 160 may generate queries that violate a set of context-free grammar rules such as "photos of posts," and "my friends who work at <user>," which are nonsense queries that produce null sets, and train the classifier neural network 720 with the generated negative queries. In particular embodiments, the social-networking system 160 may generate the negative data by accessing logged queries from a data store 164 of the online social network, where the accessed queries violate a set of context-free grammar rules, but pass the unigram check. The social-networking system 160 may generate the negative data by accessing logged queries from third-party sources. The social-networking system 160 may train the classifier neural network with the generated negative data. As an example and not by way of limitation, the social-networking system 160 may collect negative queries such as "Make things happen," or "Celebrate my birthday" and train the classifier neural network 720. Although this disclosure describes training the classifier neural network with positive data and negative data in a particular manner, this disclosure contemplates training the classifier neural network with positive data and negative data in any suitable manner.

In particular embodiments, if the search query is determined as a grammar query, the social-networking system 160 may construct a query command corresponding to the search query by processing the term embeddings with a translator neural network during a neural network translation 560 process. As the given query is determined as a grammar query and the query has no match in the standard grammar templates, the social-networking system 160 may provide the term embeddings to a grammar query translation model, which may adopt another neural network to translate the search query into a query command. As an example and not by way of limitation, illustrated in FIG. 7, the social-networking system 160 may determine that the query "photos of me" is a grammar query. The social-networking system 160 may provide the term embeddings to a grammar query translation model as input. The grammar query translation model may return a query command corresponding to the search query. Although this disclosure describes translating a grammar query by processing with a grammar query translation model in a particular manner, this disclosure contemplates translating a grammar query by processing with a grammar query translation model in any suitable manner.

In particular embodiments, the social-networking system 160 may retrieve search results by processing the query command with a grammar query processing search engine 580 if the search query is a grammar query. The grammar query processing search engine 580 may execute the query command to identify social graph entities that match the search query. The grammar query processing engine 580 may rank the identified social graph entities based on pre-determined rules and return the ranked social graph entities as search results. In particular embodiments, the social-networking system 160 may retrieve search results by processing the search query with a non-grammar query processing search engine 570 if the search query is a non-grammar query. The non-grammar query processing search engine 570 may be also known as a keyword search engine. The social-networking system 160 may provide the search query to a keyword search engine 570 as input and retrieve search results that match one or more keywords in the search query. The search results are sorted based on their respective ranks. As an example and not by way of limitation, illustrated in FIG. 4A, the social-networking system 160 may process the search query "San Francisco Giants" by a keyword search engine 570. The keyword search engine 570 may return search results that match one or more keywords in the search query. As another example and not by way of limitation, illustrated in FIG. 4B, the social-networking system 160 may process a query command (Intersect(Events_in_city(San Francisco), Event_in_time (July, 2017))) that corresponds to the search query "San Francisco Event in July" with a grammar query processing search engine 580. The grammar query processing search engine 580 may return a list of events that occurs in a city of San Francisco, Calif. and in the month of July 2017. The grammar query processing search engine 580 may rank the results based on pre-determined rules. Although this disclosure describes retrieving search results by processing the search query with an appropriate search engine in a particular manner, this disclosure contemplates retrieving search results by processing the search query with an appropriate search engine in any suitable manner.

In particular embodiments, the social-networking system 160 may send instructions for generating a search-results interface for presentation to the user to the client system 130 in response to the search query. The search-results interface may comprise references to one or more of the objects of the online social network presented in ranked order. As an example and not by way of limitation, illustrated in FIG. 4B, the social-networking system 160 may send instructions for generating a search-results interface 402B to the client system 130 in response to the search query. The user should be able to navigate through the search results using provided interface. Although this disclosure describes providing a search-results interface for presentation to the user in a particular manner, this disclosure contemplates providing a search-results interface for presentation to the user in any suitable manner.

Figure 8:
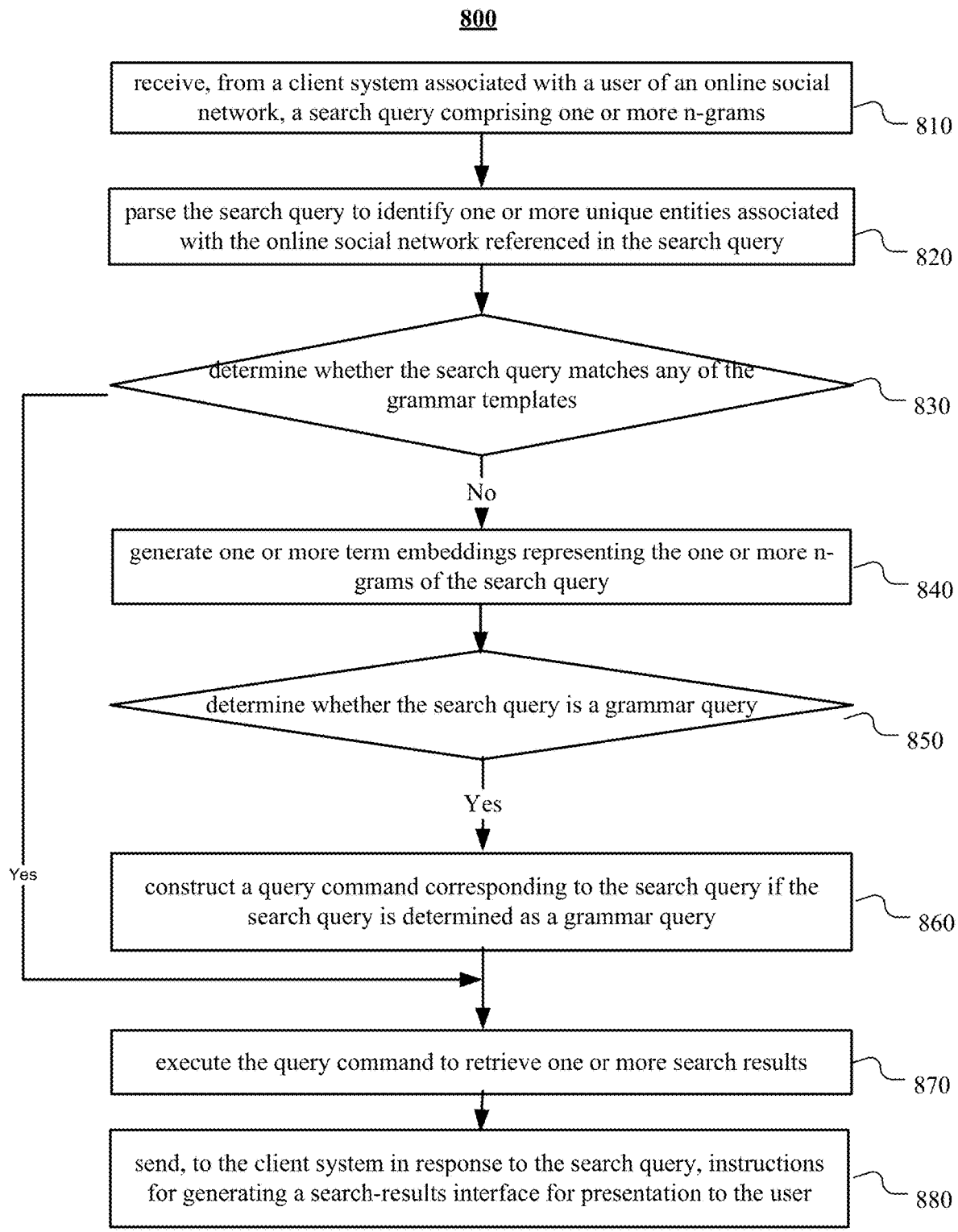
FIG. 8 illustrates an example method for processing a search query with neural network based classification models and neural network based translation models.

FIG. 8 illustrates an example method 800 for processing a search query with neural network based classification models and neural network based translation models. The method may begin at step 810, where the social-networking system 160 may receive, from a client system associated with a user of an online social network, a search query comprising one or more n-grams. At step 820, the social-networking system 160 may parse the search query to identify one or more unique entities associated with the online social network referenced in the search query. At step 830, the social-networking system 160 may determine, by checking the search query against an index of grammar templates, whether the search query matches any of the grammar templates in the index. At step 840, the social-networking system 160 may generate, using a word embedding model, one or more term embeddings representing the one or more n-grams of the search query, respectively, wherein each term embedding is a point in a d-dimensional embedding space, and wherein each term embedding for an n-gram referencing one of the unique entities is a term embedding for the respective unique entity. At step 850, the social-networking system 160 may determine, by processing the one or more term embeddings with a classifier neural network, whether the search query is a grammar query, wherein a grammar query is a type of search query that can be translated into a query command, wherein the query command comprises one or more query constraints. At step 860, the social-networking system 160 may construct a query command corresponding to the search query if the search query is determined as a grammar query. At step 870, the social-networking system 160 may execute the query command to retrieve one or more search results. At step 880, the social-networking system 160 may send, to the client system in response to the search query, instructions for generating a search-results interface for presentation to the user, the search-results interface comprising references to one or more of the objects of the online social network presented in ranked order. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for processing a search query with neural network based classification models and neural network based translation models including the particular steps of the method of FIG. 8, this disclosure contemplates any suitable method for processing a search query with neural network based classification models and neural network based translation models including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Translating Search Queries

In particular embodiments, when a social-networking system 160 receives a search query from a client system 130 associated with a user, the social-networking system 160 may determine whether the search query is a grammar query or not. A grammar query is a type of complex search query that references particular unique entities within the online social network. The grammar query can be translated into a query command, where the query command comprises one or more query constraints. A non-grammar query is a search query that does not necessarily reference particular unique entities within the online social network, and may contain one or more keywords that are required to be in the search results returned when executing the query. When the social-networking system 160 determines that the search query is a grammar query, the social-networking system 160 may map the query directly to an executable query command using an embedding-based translation model without relying on templates or context-free grammar models. With the context-free grammar models, the social-networking system 160 may have constructed a query command by parsing the search query using a context-free grammar parsing tree. On receiving a search query from a client system 130 associated with a user, the social-networking system 160 may parse the query to identify particular unique entities referenced in the search query and tag any identified entities (e.g., linking the identified n-grams to a unique identifier for the referenced entity in the social-networking system 160). This process, referred to as "entity linking," may help improve the accuracy of subsequent steps. The social-networking system 160 may check the search query against a so-called "whitelist" to see if the search query matches any pre-stored grammar query templates. The social-networking system 160 may maintain a list of popular query templates and their respective query commands. If the search query matches a template in the whitelist, the social-networking system 160 may translate the search query to a query command based on the corresponding query command stored in the whitelist and the entities tagged in the query. The whitelist process may help reduce translation time and computing cost. For a search query that does not match to any template in the whitelist, the social-networking system 160 may check whether the query is a grammar query or not with a classifier neural network, such as a Long Short-Term Memory (LSTM) classification model. The social-networking system 160 may construct term embeddings corresponding to the search query and process the term embeddings with the classifier neural network that produces a binary result indicating whether the search query is a grammar query or not. The classification process may improve the efficiency of query processing by reducing over-triggering and under-triggering, where over-triggering occurs when the social-networking system 160 parses a query using the grammar model when the query is not a grammar query and under-triggering occurs when the social-networking system 160 fails to parse a query using the grammar model when the query is a grammar query. If the query is classified as a grammar query, the social-networking system 160 may map the query directly to an executable query command using an embedding-based translation model without relying on templates or context-free grammar models. The social-networking system 160 may process the constructed term embeddings with a translator neural network implementing the translation model. The translator neural network may produce a query command after processing the input term embeddings. As an example and not by way of limitation, the social-networking system 160 may receive a search query "photos of Haixun" from a client system 130 associated with a user. The social-networking system 160 may tag Haixun as a user with a particular entity identifier assigned to Haixun in the online social network. The social-networking system 160 may translate the query into "photos (Haixun)" during the whitelist checking stage because "photos of <user>" is a stored template in the whitelist. As another example and not by way of limitation, the social-networking system 160 may receive a search query "my friends who like swimming" from a client system 130 associated with a user. The social-networking system 160 may tag swimming as an exercise activity with a particular entity identifier assigned to the concept "swimming" in a social graph. The social-networking system 160 may not find a matched template in the whitelist for the search query "my friends who like swimming." The social-networking system 160 may construct term embeddings for the search query and process the term embeddings with a classifier neural network to determine whether the search query is a grammar query. As the classifier neural network returns "Yes", the social-networking system 160 may map the term embeddings to a query command (intersect(friends(me), like(swimming)) using a translator neural network that implements an embedding-based translation model. As yet another example and not by way of limitation, a query "San Francisco Giants" may be tagged as a professional baseball team with a particular entity identifier assigned to the team in the social graph during the entity linking process. But, the classification procedure may determine that the query is a non-grammar query because the query is a simple query that only contains keywords (also referred to as a "keyword query").

In particular embodiments, the social-networking system 160 may receive a search query comprising one or more n-grams from a client system 130 associated with a user of an online social network. The social-networking system 160 may parse the search query to identify one or more unique entities associated with the online social network referenced in the search query. In particular embodiments, the social-networking system 160 may generate, using a word embedding model, one or more term embeddings representing the one or more n-grams of the search query, respectively. Each term embedding may be a point in a d-dimensional embedding space. A term embedding for an n-gram referencing one of the unique entities may be a term embedding for the respective unique entity. In particular embodiments, the social-networking system 160 may construct a query command corresponding to the search query by processing the term embeddings with a translator neural network. The translator neural network may be a Long Short-Term Memory (LSTM) network. In particular embodiments, the translator neural network may perform sequence to sequence (seq2seq) translation that requires two recurrent neural networks working together to transform one sequence to another. The translator neural network may comprise an encoding module and a decoding module. The encoding module may take the one or more term embeddings representing the one or more n-grams of the search query as an input. The decoding module may generate the one or more output term embeddings representing one or more query tokens for a query command. In particular embodiments, the translator neural network may comprise a number of memory units equal to a sum of a number of input term embeddings and a number of output term embeddings. The first k memory units of the translator neural network may belong to the encoding module, where k is the number of the input term embeddings. The last l memory units of the translator neural network may belong to the decoding module, where l is the number of the output term embeddings. In particular embodiments, the memory units in the encoding module may encode the input term embeddings into a query embedding. The query embedding may be a point in an n-dimensional embedding space. An i-th memory unit may receive an (i−1)st intermediary encoding query embedding from an (i−1)st memory unit. The i-th memory unit may generate an i-th intermediary encoding query embedding by processing the (i−1)st intermediary encoding query embedding and the i-th input term embedding with a first hidden-layer matrix. The i-th memory unit may forward the i-th intermediary encoding query embedding to an (i+1)st memory unit. In particular embodiments, the memory units in the decoding module may decode term embeddings for the query command from the query embedding received from the encoding module. A j-th memory unit may receive a (j−1)st intermediary decoding query embedding from a (j−1)st memory unit. The j-th memory unit may generate a j-th output term embedding and a j-th intermediary decoding query embedding by processing the received (j−1)st intermediary decoding query embedding with a second hidden-layer matrix. The j-th memory unit may send out the j-th output term embedding, and forward the j-th intermediary decoding query embedding to a (j+1)st memory unit. In particular embodiments, the number of input term embeddings may be upper-bounded by a first maximum vocabulary size. In particular embodiments, the number of output term embeddings may be upper-bounded by a second maximum vocabulary size. In particular embodiments, the social-networking system 160 may encode the one or more term embeddings to generate a query embedding representing the search query by the translator neural network. In particular embodiments, the social-networking system 160 may decode the query embedding to generate one or more output term embeddings representing one or more query tokens by the translator neural network. In particular embodiments, the social-networking system 160 may construct a query command from the one or more output term embeddings generated by the translator neural network. The query command may comprise the one or more query tokens represented by the one or more output term embeddings. The social-networking system 160 may then execute the query command to retrieve one or more search results. In particular embodiments, the social-networking system 160 may send instructions for generating a search-results interface for presentation to the user to the client system 130 in response to the search query. The search-results interface may comprise one or more of the retrieved search results. In particular embodiments, the translator neural network may be trained with training data comprising a plurality of a natural language query and a corresponding query command pairs. In particular embodiments, the plurality of pairs may be generated from context-free grammar rules, where the context-free grammar rules are production rules that describe all possible strings in a formal language, where the formal language comprises a set of strings of symbols and a set of rules that are specific to the language. In particular embodiments, the plurality of pairs may be generated by accessing logged queries from a data store of the online social network, where a query command for a given natural-language query may be constructed by a context-free grammar parser. In particular embodiments, the translator neural network may construct identical query commands for a plurality of paraphrased search queries that are represented by similar term embeddings. The translator neural network may construct a query command for a search query in any language that has corresponding term embeddings available.

Figure 9:
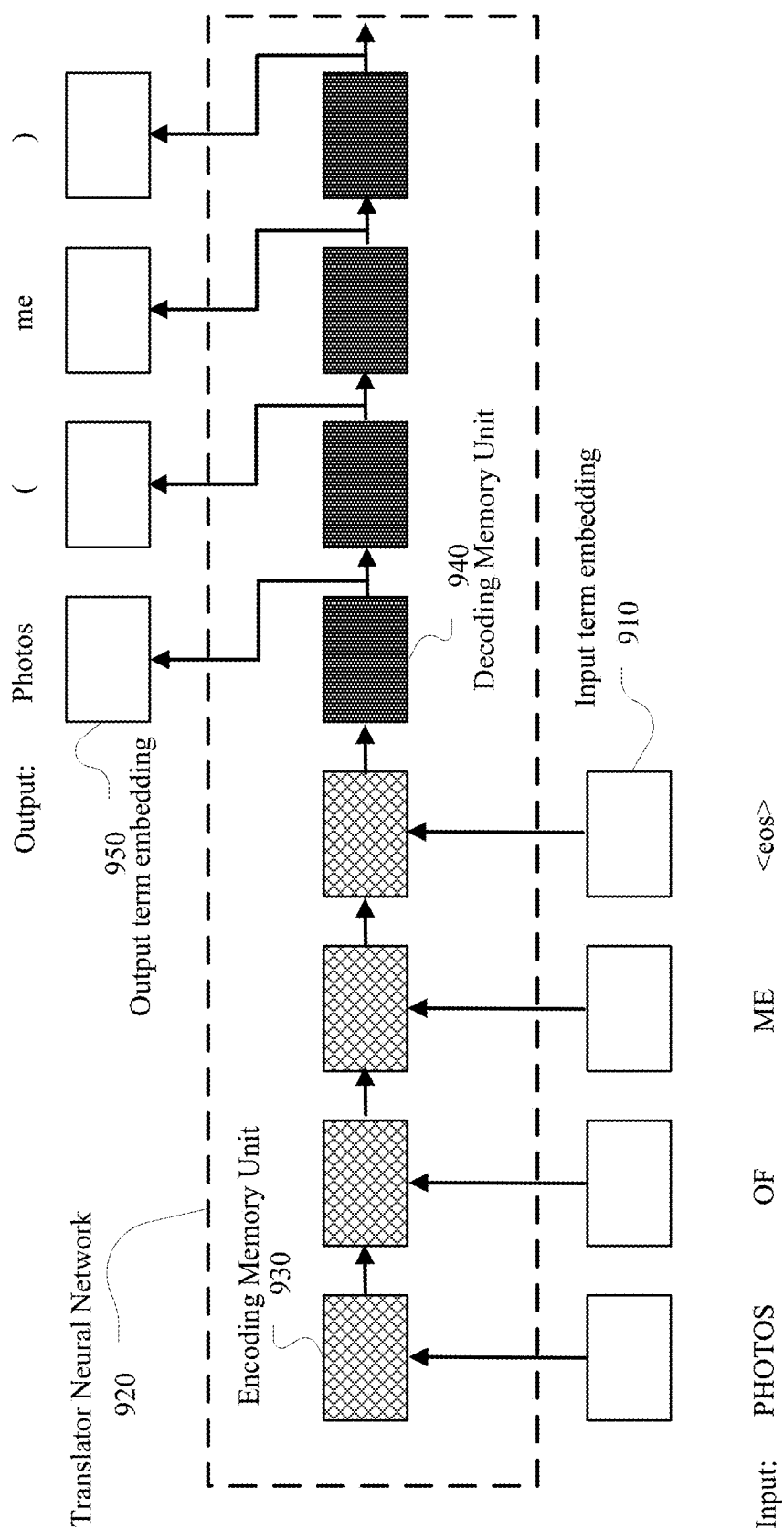
FIG. 9 illustrates an example of translating a search query into a query command with a translator neural network.

FIG. 9 illustrates an example of translating a search query into a query command with a translator neural network. In particular embodiments, the social-networking system 160 may construct a query command corresponding to the search query by processing the term embeddings with a translator neural network. The translator neural network 920 may, for example, be a Long Short-Term Memory (LSTM) network. In particular embodiments, the translator neural network 920 may perform sequence to sequence (seq2seq) translation that requires two recurrent neural networks working together to transform one sequence to another. The first neural network may be referred to as an encoding module and the second neural network may be referred to as a decoding module. The encoding module may take the one or more term embeddings representing the one or more n-grams of the search query as an input. The decoding module may generate the one or more output term embeddings representing one or more query tokens for a query command. A translator neural network 920 may be considered as a united neural network comprising an encoding module and a decoding module. In particular embodiments, the translator neural network 920 may comprise a number of memory units equal to a sum of a number of input term embeddings and a number of output term embeddings. As an example, illustrated in FIG. 9, and not by way of limitation, the social-networking system 160 may have term embeddings for a search query "photos of me." The social-networking system 160 may construct a query command for the search query by processing the search query with a translator neural network 920. The translator neural network 920 comprises as many encoding memory units 930 as the number of input term embeddings 910 and as many decoding memory units 940 as the number of output term embeddings that correspond to the query command. Although this disclosure describes constructing a query command by processing term embeddings of a search query with a translator neural network in a particular manner, this disclosure contemplates constructing a query command by processing term embeddings of a search query with a translator neural network in any suitable manner.

In particular embodiments, the social-networking system 160 may encode the one or more term embeddings to generate a query embedding representing the search query by the translator neural network. In particular embodiments, the first k memory units in the translator neural network 920 may belong to the encoding module, where k is a number of the input term embeddings. Before beginning of the encoding process, the translator neural network 920 may prepare a default query embedding. The query embedding may be a point in an n-dimensional embedding space. The default query embedding may be an empty embedding. The memory units in the encoding module may encode the input term embeddings into the query embedding. The first memory 930 unit may generate the first intermediary encoding query embedding by processing the default query embedding and the first input term embedding with a hidden-layer matrix. The first memory unit 930 may forward the first intermediary encoding query embedding to the second memory unit 930. An i-th memory unit 930 may receive an (i−1)st intermediary encoding query embedding from an (i−1)st memory unit 930. The i-th memory unit 930 may generate an i-th intermediary encoding query embedding by processing the (i−1)st intermediary encoding query embedding and the i-th input term embedding with a first hidden-layer matrix. The i-th memory unit 930 may forward the i-th intermediary encoding query embedding to an (i+1)st memory unit 930. The hidden-layer matrices on the memory units in the encoding module may be constructed as a result of training the translator neural network. As an example and not by way of limitation, illustrated in FIG. 9, the translator neural network 920 may have four input embeddings. The translator neural network 920 may prepare a default query embedding. The first memory unit 930 may produce the first encoding intermediary query embedding by processing the first term embedding corresponding to 'photos' and the default query embedding with a hidden-layer matrix. The first memory unit 930 may forward the first intermediary encoding query embedding to the second memory unit 930. The fourth memory unit 930, the last memory unit of the encoding module in the example, may produce the fourth query embedding by processing the third query embedding and the fourth term embedding with a hidden-layer matrix and forward the query embedding to the first memory unit 940 in the decoding module. Although this disclosure describes encoding input term embeddings in a particular manner, this disclosure contemplates encoding input term embeddings in any suitable manner.

In particular embodiments, the social-networking system 160 may decode the query embedding to generate one or more output term embeddings representing one or more query tokens by the translator neural network. In particular embodiments, the last l memory units of the translator neural network 920 may belong to the decoding module of the neural network, where l is the number of the output term embeddings 950. The memory units 940 in the decoding module may decode embeddings for the query command from a query embedding that is the output of the encoding module. The first memory unit 940 in the decoding module may receive a query embedding from the last memory unit 930 in the encoding module. The first memory unit 940 may generate the first output term embedding and the first intermediary decoding query embedding by processing the query embedding received from the last memory unit 930 of the encoding module. The first memory module 940 may send out the first output term embedding and forward the first intermediary decoding query embedding to the second memory unit 940. A j-th memory unit may receive a (j−1)st intermediary decoding query embedding from a (j−1)st memory unit. The j-th memory unit may generate a j-th output term embedding and a j-th intermediary decoding query embedding by processing the received (j−1)st intermediary decoding query embedding with a second hidden-layer matrix. The j-th memory unit may send out the j-th output term embedding, and forward the j-th intermediary decoding query embedding to a (j+1)st memory unit. As an example and not by way of limitation, illustrated in FIG. 9, the first memory unit 940 in the decoding module may receive a query embedding from the fourth memory unit 930 in the encoding module. The first memory unit 940 in the decoding module may generate the first output term embedding and the first intermediary decoding query embedding by processing the received query embedding with a hidden-layer matrix. The first memory unit 940 may send out the first output term embedding and forward the first intermediary decoding query embedding to the second memory unit 940. The fourth memory unit 940 in the decoding module (i.e., the last memory unit in the decoding module) may receive the third intermediary decoding query embedding from the third memory unit. The fourth memory unit 940 in the decoding module may generate the fourth term embedding by processing the third intermediary decoding query embedding with a hidden-layer matrix and send out the fourth term embedding. The hidden-layer matrices on the memory units in the decoding module may be constructed as a result of training the translator neural network. Although this disclosure describes decoding a query command from an encoded search query in a particular manner, this disclosure contemplates decoding a query command from an encoded search query in any suitable manner.

The number of memory units in a translator neural network 920 may be limited due to hardware limitations. The restriction may also be desirable to keep the processing time within acceptable range. As a result, the number of terms in the input search query and the output query command for a translator neural network 920 may be limited. In particular embodiments, the number of input term embeddings may be upper-bounded by a first maximum vocabulary size. In particular embodiments, the number of output term embeddings may be upper-bounded by a second maximum vocabulary size. As an example and not by way of limitation, the maximum vocabulary size of the input search query may be 1000 while the maximum vocabulary size of the output query command may be 500. Although this disclosure describes limiting the vocabulary size for the input search query and the output query command in a particular manner, this disclosure contemplates limiting the vocabulary size for the input search query and the output query command in any suitable manner.

In particular embodiments, the social-networking system 160 may construct a query command from the one or more output term embeddings generated by the translator neural network 920. The query command may comprise the one or more query tokens represented by the one or more output term embeddings. As the translator neural network 920 produces term embeddings corresponding to query tokens for a query command, the social-networking system 160 may need to convert the term embeddings into a query command. The social-networking system 160 may convert term embeddings into the pre-determined keywords and operators defined in the grammar using a conversion table for the keywords and operators and the respective embeddings. The social-networking system 160 may also convert term embeddings into identified unique entities by looking up a list of the entity and corresponding embedding pairs. The list of the entity and corresponding pairs may have been prepared when the social-networking system 160 generates term embeddings for the search query. As an example and not by way of limitation, illustrated in FIG. 9, the social-networking system 160 may convert the output term embeddings 950 into (photos(me)) by looking up the conversion table for the pre-determined keywords and operators. As another example and not by way of limitation, the social-networking system 160 may have a set of output term embeddings for a search query "my friends who like swimming." The social-networking system 160 may convert the output term embeddings 950 into (intersect(friends(me), like(swimming)) by looking up the conversion table for the pre-determined keywords and operators and a list of identified entities and corresponding embeddings, which has one entity 'swimming' in the given example. Although this disclosure describes converting output term embeddings into a query command in a particular manner, this disclosure contemplates converting output term embeddings into a query command in any suitable manner.

In particular embodiments, the neural network may be trained with training data comprising a plurality of a natural language query and a corresponding query command pairs. In particular embodiments, the social-networking system 160 may generate the plurality of pairs from context-free grammar rules. The context free grammar rules may be production rules that describe all possible strings in a formal language. A formal language may comprise a set of strings of symbols and a set of rules that are specific to the language. As an example and not by way of limitation, the social-networking system 160 may generate a set of grammar queries and their corresponding query command pairs including:

| "my photos" | (photos(me)) |
| "my friends photos" | (photos(friends(me)) |
| "my girlfriends photos" | (phtos(intersect(friends(me), female_users)) |
| "my daughter photos" | (photos(daughter(me)) |
| "<user> photos" | (photos(<user>) | from a context-free grammar rules as follow:

| [S] -> | [person] photos |
| [person] -> | my |
| [person] -> | my friends |
| [person] -> | my girlfriends |
| [person] -> | my daughter |
| [person] -> | <user> |

In particular embodiments, the social-networking system 160 may generate the plurality of pairs by accessing logged queries from a data store of the online social network. In particular embodiments, the social-networking system 160 may generate the plurality of pairs by accessing queries from third-party sources. The social-networking system 160 may construct a corresponding query command for a given natural language query using a context-free grammar parser. As an example and not by way of limitation, the social-networking system 160 may collect a query "my friends who live in San Francisco" from the logged queries. The social-networking system 160 may construct a query command (intersect(friends(me), live_in(San Francisco)) using a context-free grammar parser and use the query and query command pair as a training data for the translator neural network. Although this disclosure describes generating training data for the translator neural network in a particular manner, this disclosure contemplates preparing training data for the translator neural network in any suitable manner.

In particular embodiments, the social-networking system 160 may construct identical query commands for a plurality of paraphrased search queries that are represented by similar term embeddings by processing the term embeddings with the translator neural network 920. In particular embodiments, the social-networking system 160 may construct a query command for a search query in any language that has corresponding term embeddings available by processing the term embeddings with the translator neural network 920. The neural network based translation model may not rely on a ridged grammar model. Consequently, the neural network based translation model may construct the same query command for queries that use different terms and phrases, or even in different languages, as long as all the queries have the same intent. As an example and not by way of limitation, the social-networking system 160 may construct a query command (weather(today)) for any query intended to figure out current weather information including "what is the weather like," "how is the weather today?" or "¿que tiempo hace?" (which is Spanish for "how is the weather today"). All of the above queries may be represented by similar embeddings, regardless of the phrasing, terms, or language. Consequently, the translator neural network 920 can be trained to translate these embeddings to the same query command. Although this disclosure describes translating queries with identical intent into the same query command in a particular manner, this disclosure contemplates translating queries with identical intent into the same query command in any suitable manner.

In particular embodiments, the social-networking system 160 may send instructions for generating a search-results interface for presentation to the user to the client system 130 in response to the search query. The search-results interface may comprise references to one or more of the objects of the online social network presented in ranked order. As an example and not by way of limitation, illustrated in FIG. 4B, the social-networking system 160 may send instructions for generating a search-results interface 402B to the client system 130 in response to the search query. The user should be able to navigate through the search results using provided interface. Although this disclosure describes providing a search-results interface for presentation to the user in a particular manner, this disclosure contemplates providing a search-results interface for presentation to the user in any suitable manner.

Figure 10:
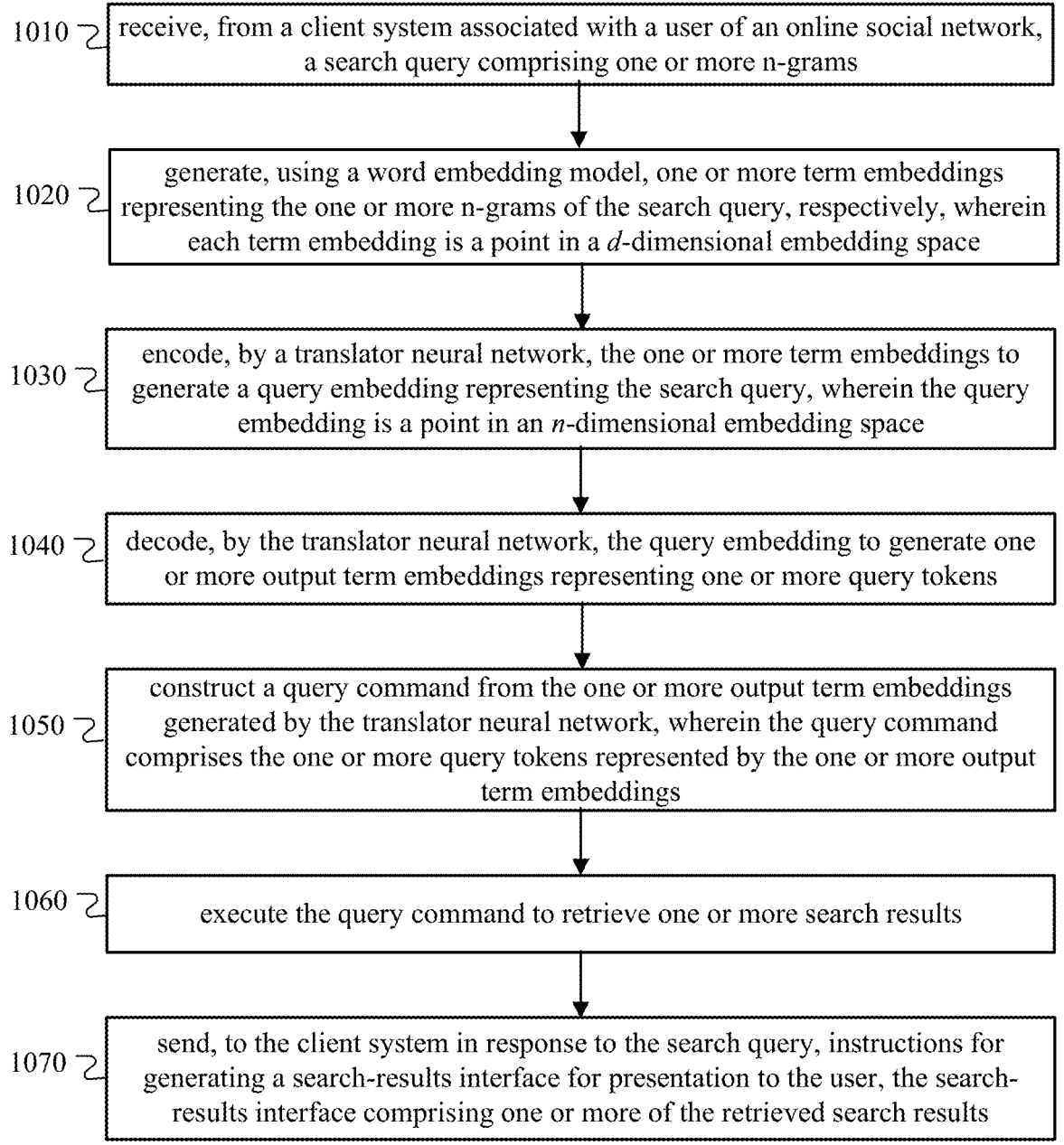
FIG. 10 illustrates an example method for translating a search query into a query command.

FIG. 10 illustrates an example method 1000 for translating a search query into a query command. The method may begin at step 1010, where the social-networking system 160 may receive, from a client system associated with a user of an online social network, a search query comprising one or more n-grams. At step 1020, the social-networking system 160 may generate, using a word embedding model, one or more term embeddings representing the one or more n-grams of the search query, respectively, wherein each term embedding is a point in a d-dimensional embedding space. At step 1030, the social-networking system 160 may encode, by a translator neural network, the one or more term embeddings to generate a query embedding representing the search query, wherein the query embedding is a point in an n-dimensional embedding space. At step 1040, the social-networking system 160 may decode, by the translator neural network, the query embedding to generate one or more output term embeddings representing one or more query tokens. At step 1050, the social-networking system 160 may construct a query command from the one or more output term embeddings generated by the translator neural network, wherein the query command comprises the one or more query tokens represented by the one or more output term embeddings. At step 1060, the social-networking system 160 may execute the query command to retrieve one or more search results. At step 1070, the social-networking system 160 may send, to the client system in response to the search query, instructions for generating a search-results interface for presentation to the user, the search-results interface comprising one or more of the retrieved search results. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for translating a search query into a query command including the particular steps of the method of FIG. 10, this disclosure contemplates any suitable method for translating a search query into a query command including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Performance Analysis

Figure 11:
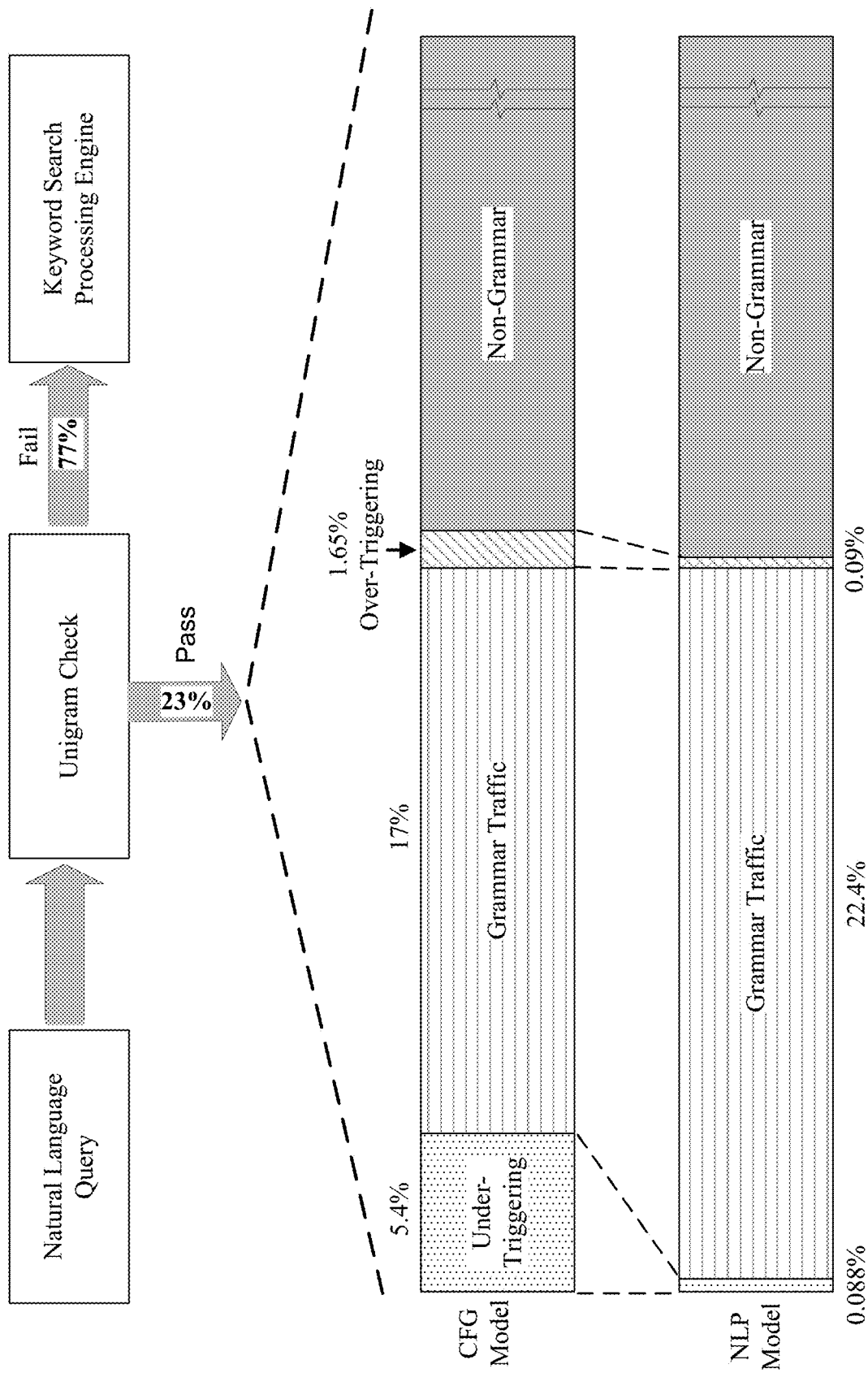
FIG. 11 illustrates experimental results from a performance comparison between a legacy context-free grammar model and a neural network based natural language processing model.

FIG. 11 illustrates experimental results from a performance comparison between a legacy context-free grammar model and a neural network based natural language processing model. In prior systems, natural-language queries were processed using context-free grammar (CFG) models. The CFG models are slow and encounter over-triggering and under-triggering, where over-triggering occurs when the social-networking system 160 parses a query using the grammar model when the query is not a grammar query and under-triggering occurs when the social-networking system 160 fails to parse a query using the grammar model when the query is a grammar query. A neural network based natural-language processing (NLP) model may improve performance considerably. As illustrated in FIG. 11, about 77% of queries are filtered during the unigram check 520. Among the 23% of the queries that pass the unigram check 520, about 5.4% were under-triggered when a CFG model is used, which is reduced to 0.088% when the neural network based NLP model is used. Also, about 1.65% of queries that passed the unigram check 520 were over-triggered when a CFG model is used, which is reduced to 0.09% under the NLP model. Average parsing time for a search query is also reduced from 180 ms under a CFG model to 100 ms under the NLP model.

Artificial Neural Network

Figure 12:
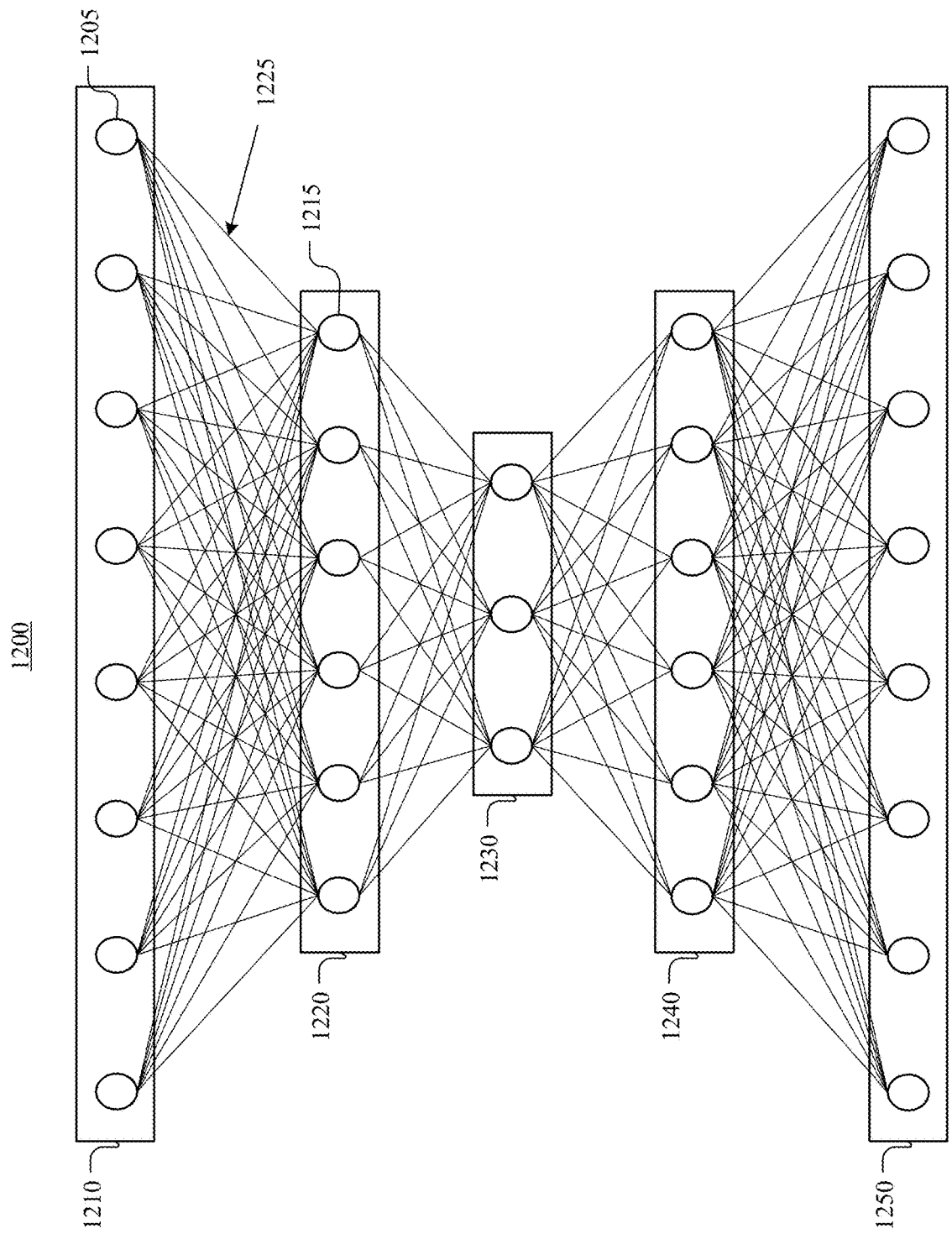
FIG. 12 illustrates an example artificial neural network.

FIG. 12 illustrates an example artificial neural network ("ANN") 1200. In particular embodiments, an ANN may refer to a computational model comprising one or more nodes. Example ANN 1200 may comprise an input layer 1210, hidden layers 1220, 1230, 1240, and an output layer 1250. Each layer of the ANN 1200 may comprise one or more nodes, such as a node 1205 or a node 1215. In particular embodiments, each node of an ANN may be connected to another node of the ANN. As an example and not by way of limitation, each node of the input layer 1210 may be connected to one of more nodes of the hidden layer 1220. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 12 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 12 depicts a connection between each node of the input layer 1210 and each node of the hidden layer 1220, one or more nodes of the input layer 1210 may not be connected to one or more nodes of the hidden layer 1220.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1220 may comprise the output of one or more nodes of the input layer 1210. As another example and not by way of limitation, the input to each node of the output layer 1250 may comprise the output of one or more nodes of the hidden layer 1240. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k}-e^{-s_k}}{e^{s_k}+e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1225 between the node 1205 and the node 1215 may have a weighting coefficient of 0.4, which may indicate that 0.4 multiplied by the output of the node 1205 is used as an input to the node 1215. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1200 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 13:
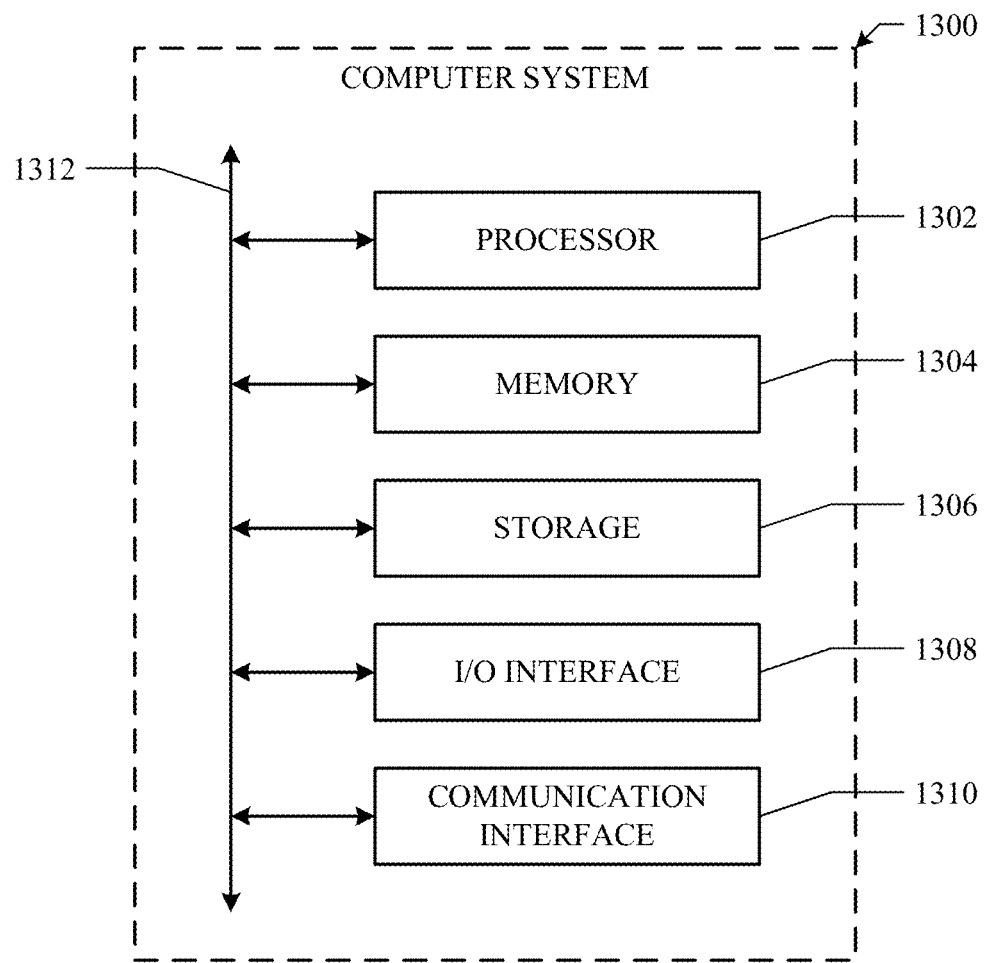
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
    receiving, from a client system associated with a user of an online social network, a search query comprising one or more n-grams;
    generating, using a word embedding model, one or more term embeddings representing the one or more n-grams of the search query, respectively, wherein each term embedding is a point in a d-dimensional embedding space;

encoding, by a translator neural network, the one or more term embeddings to generate a query embedding representing the search query, wherein the query embedding is a point in an n-dimensional embedding space;

decoding, by the translator neural network, the query embedding to generate one or more output term embeddings representing one or more query tokens, wherein the translator neural network comprises a number of memory units equal to a sum of a number of input term embeddings and a number of output term embeddings, wherein the first k memory units of the translator neural network belong to an encoding module and the last l memory units of the translator neural network belong to a decoding module, wherein k is the number of the input term embeddings and l is the number of the output term embeddings;

constructing a query command from the one or more output term embeddings generated by the translator neural network, wherein the query command comprises the one or more query tokens represented by the one or more output term embeddings;

executing the query command to retrieve one or more search results; and sending, to the client system in response to the search query, instructions for generating a search-results interface for presentation to the user, the search-results interface comprising one or more of the retrieved search results.

2. The method of claim 1, further comprising:

parsing the search query to identify one or more unique entities associated with the online social network referenced in the search query, wherein each term embedding for an n-gram referencing one of the unique entities is a term embedding for the respective unique entity.

3. The method of claim 1, wherein the translator neural network is a Long Short-Term Memory (LSTM) network.

4. The method of claim 1, wherein the translator neural network performs a sequence to sequence (seq2seq) translation, wherein the seq2seq translation requires two recurrent neural networks working together to transform one sequence to another.

5. The method of claim 1, wherein the translator neural network comprises an encoding module and a decoding module, wherein the encoding module takes the one or more term embeddings representing the one or more n-grams of the search query as an input and the decoding module generates the one or more output term embeddings representing one or more query tokens for a query command.

6. The method of claim 1, wherein the memory units in the encoding module encode the input term embeddings into the query embedding, wherein an i-th memory unit receives an (i−1)st intermediary encoding query embedding from an (i−1)st memory unit, generates an i-th intermediary encoding query embedding by processing the (i−1)st intermediary encoding query embedding and the i-th input term embedding with a first hidden-layer matrix, and forwards the i-th intermediary encoding query embedding to an (i+1)st memory unit.

7. The method of claim 1, wherein the memory units in the decoding module decode term embeddings for the query command from the query embedding received from the encoding module, wherein a j-th memory unit receives a (j−1)st intermediary decoding query embedding from a (j−1)st memory unit, generates a j-th output term embedding and a j-th intermediary decoding query embedding by processing the received (j−1)st intermediary decoding query embedding with a second hidden-layer matrix, sends out the j-th output term embedding, and forwards the j-th intermediary decoding query embedding to a (j+1)st memory unit.

8. The method of claim 1, wherein the number of input term embeddings is upper-bounded by a first maximum vocabulary size.

9. The method of claim 1, wherein the number of output term embeddings is upper-bounded by a second maximum vocabulary size.

10. The method of claim 1, wherein the translator neural network is trained with training data comprising a plurality of a natural language query and a corresponding query command pairs.

11. The method of claim 10, wherein the plurality of pairs are generated from context-free grammar rules, wherein the context-free grammar rules are production rules that describe all possible strings in a formal language, wherein the formal language comprises a set of strings of symbols and a set of rules that are specific to the language.

12. The method of claim 10, wherein the plurality of pairs are generated by accessing logged queries from a data store of the online social network, wherein a query command for a given natural language query is constructed by a context-free grammar parser.

13. The method of claim 1, wherein the translator neural network constructs identical query commands for a plurality of paraphrased search queries that are represented by similar term embeddings.

14. The method of claim 1, wherein the translator neural network constructs a query command for a search query in any language that has corresponding term embeddings available.

15. One or more computer-readable non-transitory storage media embodying software that is operable when executed to:

receive, from a client system associated with a user of an online social network, a search query comprising one or more n-grams;

generate, using a word embedding model, one or more term embeddings representing the one or more n-grams of the search query, respectively, wherein each term embedding is a point in a d-dimensional embedding space;

encode, by a translator neural network, the one or more term embeddings to generate a query embedding representing the search query, wherein the query embedding is a point in an n-dimensional embedding space;

decode, by the translator neural network, the query embedding to generate one or more output term embeddings representing one or more query tokens, wherein the translator neural network comprises a number of memory units equal to a sum of a number of input term embeddings and a number of output term embeddings, wherein the first k memory units of the translator neural network belong to an encoding module and the last l memory units of the translator neural network belong to a decoding module, wherein k is the number of the input term embeddings and l is the number of the output term embeddings;

construct a query command from the one or more output term embeddings generated by the translator neural network, wherein the query command comprises the one or more query tokens represented by the one or more output term embeddings;

execute the query command to retrieve one or more search results; and send, to the client system in response to the search query, instructions for generating a search-results interface for presentation to the user, the search-results interface comprising one or more of the retrieved search results.

16. The media of claim 15, wherein any unique entities referenced by one or more n-grams in the search query are identified, wherein an n-gram referencing a unique entity is represented by a word embedding for the unique entity when the one or more term embeddings are generated.

17. The media of claim 15, wherein the translator neural network is a Long Short-Term Memory (LSTM) network.

18. The media of claim 15, wherein the translator neural network performs a sequence to sequence (seq2seq) translation, wherein the seq2seq translation requires two recurrent neural networks working together to transform one sequence to another.

19. A system comprising: one or more processors; and a non-transitory memory coupled to the processors comprising instructions executable by the processors, the processors operable when executing the instructions to:

receive, from a client system associated with a user of an online social network, a search query comprising one or more n-grams;

generate, using a word embedding model, one or more term embeddings representing the one or more n-grams of the search query, respectively, wherein each term embedding is a point in a d-dimensional embedding space;

encode, by a translator neural network, the one or more term embeddings to generate a query embedding representing the search query, wherein the query embedding is a point in an n-dimensional embedding space;

decode, by the translator neural network, the query embedding to generate one or more output term embeddings representing one or more query tokens, wherein the translator neural network comprises a number of memory units equal to a sum of a number of input term embeddings and a number of output term embeddings, wherein the first k memory units of the translator neural network belong to an encoding module and the last l memory units of the translator neural network belong to a decoding module, wherein k is the number of the input term embeddings and l is the number of the output term embeddings;

construct a query command from the one or more output term embeddings generated by the translator neural network, wherein the query command comprises the one or more query tokens represented by the one or more output term embeddings;

execute the query command to retrieve one or more search results; and send, to the client system in response to the search query, instructions for generating a search-results interface for presentation to the user, the search-results interface comprising one or more of the retrieved search results.

* * * * *